US008040138B2

(12) United States Patent
Sugai et al.

(10) Patent No.: US 8,040,138 B2
(45) Date of Patent: Oct. 18, 2011

(54) PLANAR TYPE FREQUENCY SHIFT PROBE FOR MEASURING PLASMA ELECTRON DENSITIES AND METHOD AND APPARATUS FOR MEASURING PLASMA ELECTRON DENSITIES

(75) Inventors: Hideo Sugai, Nagoya (JP); So Yajima, Nagoya (JP); Keiji Nakamura, Nagoya (JP)

(73) Assignee: National University Corporation Nagoya University, Nagoya-shi (JP)

( * ) Notice: Subject to any disclaimer, the term of this patent is extended or adjusted under 35 U.S.C. 154(b) by 506 days.

(21) Appl. No.: 12/065,018

(22) PCT Filed: Aug. 25, 2006

(86) PCT No.: PCT/JP2006/317298

§ 371 (c)(1), (2), (4) Date: Feb. 27, 2008

(87) PCT Pub. No.: WO2007/026859

PCT Pub. Date: Mar. 8, 2007

(65) Prior Publication Data

US 2009/0230973 A1 Sep. 17, 2009

(30) Foreign Application Priority Data

Aug. 31, 2005 (JP) ................................ 2005-252525

(51) Int. Cl.
*G01N 27/62* (2006.01)

(52) U.S. Cl. ....................................................... 324/464

(58) Field of Classification Search ................... 324/464
See application file for complete search history.

(56) References Cited

U.S. PATENT DOCUMENTS

| | | | |
|---|---|---|---|
| 6,541,982 B2 * | 4/2003 | Kitagawa et al. | 324/464 |
| 7,309,842 B1 * | 12/2007 | Doughty | 219/121.43 |
| 7,339,656 B2 * | 3/2008 | Matsumoto et al. | 356/72 |
| 2002/0047543 A1 * | 4/2002 | Sugai et al. | 315/111.21 |
| 2004/0189325 A1 * | 9/2004 | Strang | 324/638 |

FOREIGN PATENT DOCUMENTS

| | | |
|---|---|---|
| JP | 9 161992 | 6/1997 |
| JP | 2000 100599 | 4/2000 |
| JP | 2001 196199 | 7/2001 |

(Continued)

OTHER PUBLICATIONS

R.B Piejak et al: "The Hairpin Resonator: A Plasma Density Measuring Techniques Revisited", Journal of Applied Physics, vol. 95, No. 7,1, pp. 3785-3791, 2004.

(Continued)

*Primary Examiner* — Jeff Natalini

(74) *Attorney, Agent, or Firm* — Oblon, Spivak, McClelland, Maier & Neustadt, L.L.P.

(57) ABSTRACT

A planar type frequency shift probe that utilizes resonance of electromagnetic waves and includes a main body with a conductor plate and a coaxial cable. The main body includes a long narrow space, which has predetermined width and length and has an opening on the periphery of the main body, as well as the first surface part and the second surface part. The surface conductor of the coaxial cable is connected to the first surface part while the core conductor of the coaxial cable is connected to the second surface part via a lead wire.

11 Claims, 19 Drawing Sheets

FOREIGN PATENT DOCUMENTS

| | | |
|---|---|---|
| JP | 2002 043093 | 2/2002 |
| JP | 2003 08325 | 1/2003 |
| JP | 2004 055324 | 2/2004 |
| JP | 2004 129234 | 4/2004 |
| WO | 02 095869 | 11/2002 |

OTHER PUBLICATIONS

R.L. Stenzel: "Microwave Resonator Probe for Localized Density Measurements in Weakly Magnetized Plasmas," Rev. Sci. Instrum., vol. 47, No. 5 pp. 603-607, 1976.

* cited by examiner

PLANAR TYPE FREQUENCY SHIFT PROBE FOR MEASURING PLASMA ELECTRON DENSITIES AND METHOD AND APPARATUS FOR MEASURING PLASMA ELECTRON DENSITIES

TECHNICAL FIELD

The present invention relates to a planar type frequency shift probe for measuring plasma electron densities as well as a method and an apparatus for measuring plasma electron densities and, more specifically, relates to a planar type frequency shift probe for measuring electron densities in a plasma generated in a vessel, by use of the resonance of electromagnetic waves, as well as a method and an apparatus for measuring plasma electron densities by using the probe.

The planar type frequency shift probe according to the present invention for measuring plasma electron densities as well as the method and the apparatus for measuring plasma electron densities by using the probe can be applied to measurement of plasma electron densities in plasmas which are utilized, for example, in processes for manufacturing thin film elements as well as in beam sources or analytical equipment.

BACKGROUND ART

Material processing technologies using plasmas generated in the discharge of reactive gases, such as etching and CVD (chemical vapor deposition), are being widely employed in industries and have taken root as important basic technologies. For further advancement of these technologies, it is strongly desired to make precise measurement of plasma states, especially plasma electron densities, as their basic information, and make a definite grasp of their sizes, spatial distributions and changes with time for proper control of plasma states. However, it cannot be said that the technique for measuring plasma electron densities has been well established to satisfactorily meet the needs from industries.

A classical method for measuring plasma electron densities employs a "Langmuir probe", as shown in FIG. 17. In this method, a metal electrode 82 is inserted in a plasma 81 generated in a plasma vessel 80 and the current is measured, which is generated when a direct current voltage is applied to the electrode 82. This method is very effective as well as convenient for discharge plasmas of argon, hydrogen, nitrogen and the like which yield no film deposition. In practical material processes using reactive plasmas, however, the surface of the metal electrode 82 inserted in the plasma 81 is covered with a deposition film, which often causes deterioration of the voltage-current characteristics. Therefore, it is difficult to employ a Langmuir probe in material processes using reactive plasmas. In addition, since heavy metal contaminants are emitted from the Langmuir probe, it is particularly difficult to apply the probe to semiconductor processes.

As a method which is unaffected by metal contamination and thin film deposition, the "microwave interference method" has been known, in which microwaves are irradiated from an incident antenna 83 to a plasma 81 and the microwaves transmitted through the plasma 81 are received at a receiving antenna 84, as shown in FIG. 18. The plasma electron densities are obtained from measurement of the phase difference caused by transmission of microwaves through the plasma 81. However, this technique has the following demerits. The method requires large windows for incidence and transmittance of microwaves as well as a large size of plasma 81 and it can only obtain the mean density of electrons along the passage of microwaves(spatial resolution is unobtainable). In addition, the measuring apparatus is expensive.

On the other hand, a highly sensitive method for measuring plasma electron densities by using a "surface wave probe" (also called plasma absorption probe) has been recently developed, which is unaffected by thin film deposition, yields no emission of metal contaminants and provides a sufficient spatial resolution (see, for example, Patent Document 1, Japanese Unexamined Patent Publication(KOKAI) No. 2000-100599).

In this method, surface waves propagating along the surface of a rod type surface wave probe 85 inserted in a plasma 81 are excited by microwave signals transmitted from a network analyzer 86, as shown in FIG. 19. The surface wave probe 85 houses a coaxial cable and a loop antenna connected with the cable in a dielectric tube. At a specific frequency $f_0$, decided by the electron density, the surface waves become resonant standing waves and are strongly excited. At this instant, the signals reflecting from the surface wave probe 85 decrease their intensities resonantly and can be observed by the network analyzer 86. Thus, the electron density can be obtained from measurement of the resonant frequency $f_0$.

The method using this surface wave probe can be widely applied to reactive plasmas. It is applicable to electron densities from $10^8$ $cm^{-3}$ to $10^{12}$ $cm^{-3}$ and discharge pressures from $10^{-5}$ Torr to 10 Torr.

The spatial distribution of electron densities can be measured with a resolution of several mm, by moving a surface wave prove 85 which is inserted in a plasma 81 through a port hole of a vessel 80. This function provides an important means for research and development in which a detailed survey is required for search of the optimum conditions.

However, in volume production under fixed conditions, the need is low to measure the spatial distributions of electron densities with high resolutions as minute as several mm. Reversely, when a foreign body such as a surface wave probe is protruded into a plasma in a volume production equipment, the plasma is likely to be disturbed during the plasma process. And, when the plasma vessel is cleaned after the process, the surface wave probe 85 protruding into the vessel is likely to be damaged.

To cope with the difficulties, a plan may be thought, in which the conventional rod type surface wave probe is retracted to a position where the tip of the probe is flush with the wall surface of a plasma vessel. However, when the probe is retracted to the vicinity of the wall surface where the electron density is small, significant signals are hidden by noises, leading to inaccurate measurement.

On the other hand, another method to measure plasma electron densities has been known, which employs a metallic dipole antenna and utilizes the resonance of electromagnetic waves (see Non-Patent Document 1: R. L. Stenzel, Rev. Sci. Instrum. 47, 604 (1976) and Non-Patent Document 2: R. B. Piejak, V. A. Godyak, R. Gamer, B. M. Alexandrovich and N. Stemberg, J. Appl. Phys. 95, 3785 (2004)).

In general, the wave length $\lambda$ of electromagnetic waves, not limited to plasmas, propagating through a medium space with a dielectric constant $\in$ is given by $\lambda=c/(\in^{1/2})$, where c is the light velocity in vacuum. Consider a T-shape antenna, in which a metallic wire with a length L is connected to the core conductor of a coaxial cable and another metallic wire with the same length L is connected to the surface conductor of the cable. When the antenna is placed in a medium space with a dielectric constant $\in$ and an electric power with a frequency f is sent to the antenna, electromagnetic waves are resonated at a frequency when $L=\lambda/4$ and the electric power is stored in the antenna. This kind of antenna is called a dipole antenna.

For given dipole length 2L and dielectric constant ∈, the resonant frequency is given by $$f_r = c/(4L\in^{1/2}) \qquad (1)$$

In the simplest approximation(cold plasma model with no collisions) for a plasma space, the dielectric constant of the plasma is given by the following equation.

$$\in = 1 - (f_p^2/f^2) \qquad (2)$$

Here, $f_p$ is a physical quantity called electron plasma frequency and is given by the following equation.

$$f_p = (1/2\pi)\cdot(e^2 n_e/m_e \in_0)^{1/2} \qquad (3)$$

where e and $m_e$ are the electrical charge and mass of an electron, respectively, $\in_0$ is the dielectric constant of vacuum and $n_e$ is the electron density.

The resonant frequency $f_r$ of a dipole antenna in a plasma can be determined by substituting equations (2) and (3) into equation (1). If $f_0$ denotes the resonant frequency in vacuum, free from plasmas, the following relation is obtained.

$$f_r^2 = f_0^2 + f_p^2 \qquad (4)$$

Therefore, the electron density $n_e$ can be determined from the difference between two measured data of $f_0$ (GHz) and $f_r$ (GHz), as expressed by the following equation.

$$n_e = \{(f_r^2 - f_0^2)/0.81\}\ (10^{10}\ \mathrm{cm}^{-3}) \qquad (5)$$

A standard dipole antenna has a T-shape and the tip of the coaxial electric wire is connected vertically with a rectilinear radiant antenna with a total length of λ/2. However, the radiant antenna is not necessarily needed to be rectilinear but it may take an oval or U-shape. In either case, resonance occurs at the frequency when the total circumferential length of an antenna is equal to λ/2. In measurement of plasma electron densities, U-shape is preferable than T-shape because the size of the port hole for insertion of the antenna through a vessel wall is small.

FIG. 20 shows a U-shape wire type frequency shift probe as a U-shape antenna, inserted in a plasma 81. FIG. 21 depicts the principle of the U-shape wire type frequency shift probe, described in the aforementioned Non-Patent Document 1. Here, the magnetic force lines generated by the current flowing through a micro-loop(transmitting loop antenna) 89 mounted on the tip of a coaxial cable 88 interlace with the bottom of a U-shape antenna 90 and drive electric current along U-shape wire, from which electromagnetic waves are emitted. The emitted waves are picked up by another micro-loop (receiving loop antenna) 91. Then, I and T are assumed to denote the power incident on the transmitting loop antenna 89 and the transmitting power received on the receiving loop antenna 91, respectively. As shown in FIG. 23(*a*), when the incident power I is constant independent of frequency f, the transmitting power T becomes resonantly strong at the frequency $f_r$ to satisfy the relation, L=λ/4,as shown in equation (2). Here, the width d of the U-shape antenna 90 is designed to be larger than the thickness (several mm) of a sheath generated around the U-shape wire.

The probe in FIG. 21 requires two loops for power transmission and reception as well as two coaxial cables. In contrast with this, the aforementioned Non-Patent Document 2 describes a method to monitor the reflective power R by using one loop and one coaxial cable, as shown in FIG. 22. Here, tip C of core conductor 93 of coaxial cable 92 is connected with point A in the bottom of the U-shape antenna 94 via an arc shape lead wire 95. And, the bottom of U-shape antenna 94 is connected with the surface conductor 96 of the coaxial cable 92 at point G. In this situation, power I incident from the coaxial cable 92 is used to excite the U-shape antenna 94 through the arc shape lead wire. The rest of the power, as reflective power R, is sent back to the power source from the coaxial cable 92. A network analyzer functions to send a micro amount of incident power I to the antenna while sweeping frequencies and monitor reflective power R returning back from the antenna to the power source in the network analyzer. When reflective power R is measured, the power is found to resonantly decreased at the resonant frequency $f_r$, as shown in FIG. 23(*c*). Plasma electron densities can be determined from this decrease by use of equation (5).

However, in the U-shape antenna 94 acting as a U-shape wire type frequency shift probe, described in Non-Patent Document 2, it is required to connect a lead wire 95 of micro arc shape to the U-shape antenna 94 at the tip of a thin coaxial cable 92. Therefore, it is difficult to fabricate and its mechanical strength is low. Furthermore, the U-shape antenna 94 as a measuring probe has a long thin shape as is the case with a surface wave probe. When this U-shape antenna 94 is protruded into a plasma through the wall of a plasma vessel, it causes a large disturbance in the plasma and it is subject to damage in volume production equipment.

Patent Document 1 describes an example which employs a flat metallic plate several mm wide as a special shape surface wave probe. However, in this case, a simple rectangular metallic plate is adopted just as an antenna of a surface wave probe, which functions on a different principle from that of a frequency shift probe that uses the resonance of electromagnetic waves.

DISCLOSURE OF INVENTION

The present invention has been done in view of such circumstances. Namely, it is an object to provide a planar type frequency shift probe which uses the resonance of electromagnetic waves, is easy to fabricate and has a high mechanical strength.

It is another object to prevent plasma disturbance and damage to the measuring probe due to protrusion of the probe into a plasma.

It is still another object to minimize a planar type frequency shift probe that is easy to fabricate and has a high mechanical strength.

The planar type frequency shift probe for measuring plasma electron densities, according to the present invention, to solve the above-mentioned assignments, comprises a main body with an electrically conductive plate and a coaxial cable comprising a surface conductor and a core conductor embedded in a dielectric material filled within the surface conductor, both of which are electrically connected to one surface of the main body and is capable of measuring plasma electron densities in a vessel by use of the resonance of electromagnetic waves. The main body comprises a connecting part adjacent to the dead end of a long narrow space, in which one of the both ends of the space has an opening on the periphery of the main body, and the first and second surface parts which are separated by the connecting part and yet mechanically integrated by the connecting part. And, the surface conductor of the above-mentioned coaxial cable is connected to one of the first and second surface parts, while the core conductor is connected to the other of the first and second surface parts.

In this planar type frequency shift probe for measuring plasma electron densities, the main body with an electric conductor plate comprises the first and second surface parts and a connecting part which integrates the first and second surface parts. And, one of the first and second surface parts is connected to the surface conductor of a coaxial cable and the other is connected to the core conductor of the cable. Therefore, this probe is easier to fabricate and has a higher mechanical strength, compared with the aforementioned conventional U-shape wire type frequency shift probe.

When the probe is used for measurement in a situation that the probe is inserted in a port hole penetrating through the wall of the aforementioned vessel and the main body is situated along the inner wall surface of the vessel, plasma disturbance due to protrusion of the probe into a plasma can be suppressed. And, the probe is in little danger of damage when it is subjected to maintenance in this situation. Thus, the planar type frequency shift probe can be favorably used for plasma electron density measurement in volume production equipment.

For favorable use of the planar type frequency shift probe of the present invention for measuring plasma electron densities, it is preferred that the width of the aforementioned long narrow space is determined, based on the sheath thickness decided from plasma electron densities and electron temperatures and the length of the space is determined, based on plasma electron densities to be measured, desired precision of the measurement and resonant frequencies at which desired precision is attainable.

In view of optimum introduction of a plasma into the long narrow space, the width of the space is preferred to be sufficiently large, compared with the sheath thickness decided from plasma electron densities and electron temperatures.

Since the frequency limit for measurement of a network analyzer is mostly around 3 GHz, a longer narrow space is favorable for measurement of high electron density plasmas within the allowable frequency range.

In the planar type frequency shift probe of the present invention for measuring plasma electron densities, it is preferable, in some case, to provide the aforementioned first surface part with a larger area, compared with the second surface part. In this case, a good mechanical strength of the probe is assured by the first surface part with a larger area, compared with the second surface part.

In the favorable mode of the planar type frequency shift probe of the present invention for measuring plasma electron densities, the surface conductor of the aforementioned coaxial cable is connected to the aforementioned first surface part, while the core conductor is connected to the second surface part and the coaxial cable is housed within the projection area of the first surface part.

When the surface conductor of the coaxial cable is connected to the first surface part, as described above, the coaxial cable can be effectively shielded from a plasma by the first surface part. And, when the coaxial cable is arranged so that the surface conductor can be housed within the projection area of the first surface part, the first surface part can shield the surface conductor from a plasma.

Especially, when the first surface part is designed to have a larger area than the second surface part and the surface conductor and the core conductor of the aforementioned coaxial cable are connected to the first and second surface parts, respectively, the surface conductor with a larger external diameter than the core conductor is connected to the first surface part with a larger size than the second surface part. In this case, since the larger conductor is connected to the larger surface part and the smaller conductor is connected to the smaller surface part, the probe is easier to fabricate. And, impurity contamination is more favorably prevented because the coaxial cable can be more effectively shielded from a plasma. Moreover, if the coaxial cable is arranged so that the surface conductor can be housed within the projection area of the first surface part, the first surface part with a larger area can securely shield the surface conductor from a plasma.

In the favorite mode of the planar type frequency shift probe of the present invention for measuring plasma electron densities, the aforementioned long narrow space comprises a series of rectilinear or curved spaces which spirally extend to the center from the periphery of the aforementioned main body.

Since the long narrow space in this planar type frequency shift probe for measuring plasma electron densities is designed to extend spirally, the long narrow space can be easily lengthened, irrespective of the size of the main body. As understood from the aforementioned equation (1), the resonant frequency $f_r$ can be decreased by increasing the length L of the long narrow space. Therefore, when the resonant frequency $f_r$ is desired to be lowered below a predetermined value, the size of the main body can be decreased while the length L of the long narrow space required for plasma electron density measurement is being kept above a predetermined value.

In the favorable mode of the planar type frequency shift probe of the present invention for measuring plasma electron densities, the aforementioned main body has a thin dielectric film on the surface opposite to the surface connected to the aforementioned coaxial cable.

In this planar type frequency shift probe for measuring plasma electron densities, since the aforementioned opposite surface exposed to a plasma is coated with a thin dielectric film, emission of impurities from the main body can be suppressed and contamination of a plasma by impurities can be prevented.

In the favorable mode of the planar type frequency shift probe of the present invention for measuring plasma electron densities, the aforementioned main body has a thin dielectric film on the entire surface of the main body except the electrical connection points with the aforementioned coaxial cable.

In this planar type frequency shift probe, the entire surface excluding the electrical connection points with the coaxial cable is coated with a thin dielectric film. As seen from the aforementioned equation (1), the resonant frequency $f_r$ can be lowered if the dielectric constant $\in$ is increased. Therefore, if the resonant frequency $f_r$ is desired to be lowered below a predetermined value, the size of the main body can be decreased while the dielectric constant E required for plasma electron density measurement is being kept above a predetermined value.

If the thin dielectric film is too thick, the probe is less susceptible to plasma effects, leading to decrease in measurement sensitivity. Because of this, from a view to suppress a drop in measurement precision due to the dielectric film, the thickness of the thin dielectric film is preferred to be preferably less than 2 mm and, more preferably, less than 0.1 mm. On the other hand, in order to assure the miniaturization of the main body due to increase in dielectric constant $\in$, the thickness of the thin dielectric film is preferred to be preferably more than 0.5 mm and, more preferably, more than 2 mm.

The materials of the aforementioned thin dielectric film are not limited to specific materials and can be suitably selected from quartz, plastics, ceramics and the like. In consideration of the ease in handling, ceramic materials such as alumina are preferable.

The method for measuring plasma electron densities of the present invention to solve the aforementioned assignments is in an embodiment a method to employ the planar type frequency shift probe, wherein the aforementioned planar type frequency shift probe inserted within a port hole of the aforementioned vessel is arranged during measurement so that the main body of the probe is situated along the inner wall surface of the aforementioned vessel.

In this method for measuring plasma electron densities, since measurement is made in a situation that aforementioned main body is situated along the inner wall surface of a vessel, it is possible to suppress plasma disturbance due to protrusion of the planar type frequency shift probe into a plasma during measurement. And, even if the planar type frequency shift probe is subjected to maintenance in this situation, the probe is hardly subject to damage. Therefore, the probe can be favorably used for plasma electron densities in volume production equipment.

The apparatus for measuring plasma electron densities of the present invention to solve the aforementioned assignments is in an embodiment a device wherein the planar type frequency shift probe situated within a port hole of the aforementioned vessel.

In this apparatus for measuring plasma electron densities, since the planar type frequency shift probe is arranged within a port hole of a vessel, it is possible to prevent plasma disturbance due to protrusion of the planar type frequency shift probe into a plasma during measurement. And, even if the planar type frequency shift probe is subjected to maintenance in this situation, the probe is hardly subject to damage. Therefore, the probe can be favorably used for plasma electron densities in volume production equipment.

In the favorable mode of the apparatus of the present invention for measuring plasma electron densities, the aforementioned planar type frequency shift probe is situated within the aforementioned port hole so that the inner wall surface of the aforementioned vessel can be almost flush with the opposite surface of the aforementioned main body.

In this apparatus for measuring plasma electron densities, since the planar type frequency shift probe is situated within a port hole so that the inner wall surface of the aforementioned vessel can be almost flush with the opposite surface of the aforementioned main body, the planar type frequency shift probe dose not protrude into a plasma during plasma electron density measurement. Owing to this, plasma disturbance as well as damage to the planar type frequency shift probe can be securely prevented.

BEST MODE FOR CARRYING OUT THE INVENTION

Hereinafter, the embodiment modes of the present invention will be described more specifically, while making reference to drawings.

Embodiment No. 1

Figure 1:
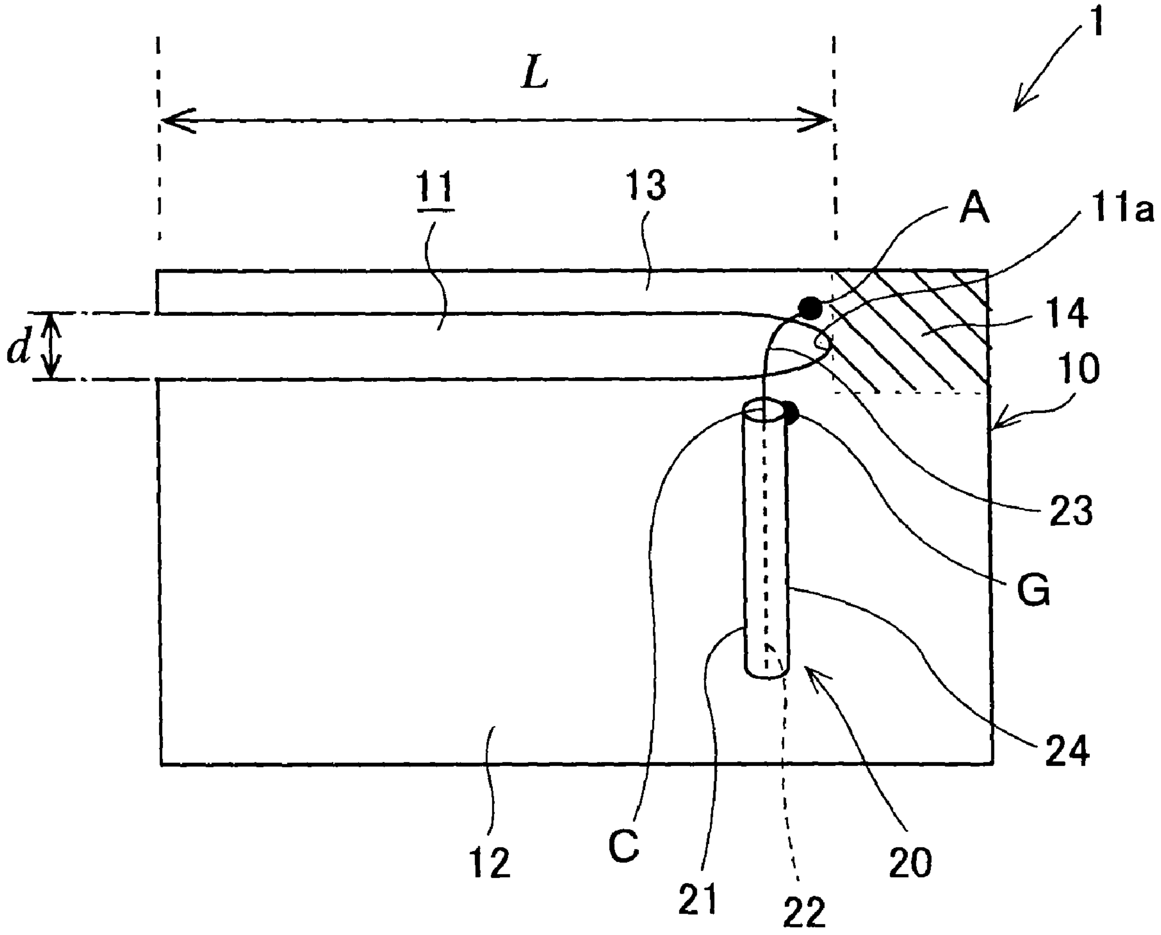
FIG. 1 is a schematic plane diagram for illustrating the entire construction of the planar type frequency shift probe according to Embodiment No. 1.
Figure 2:
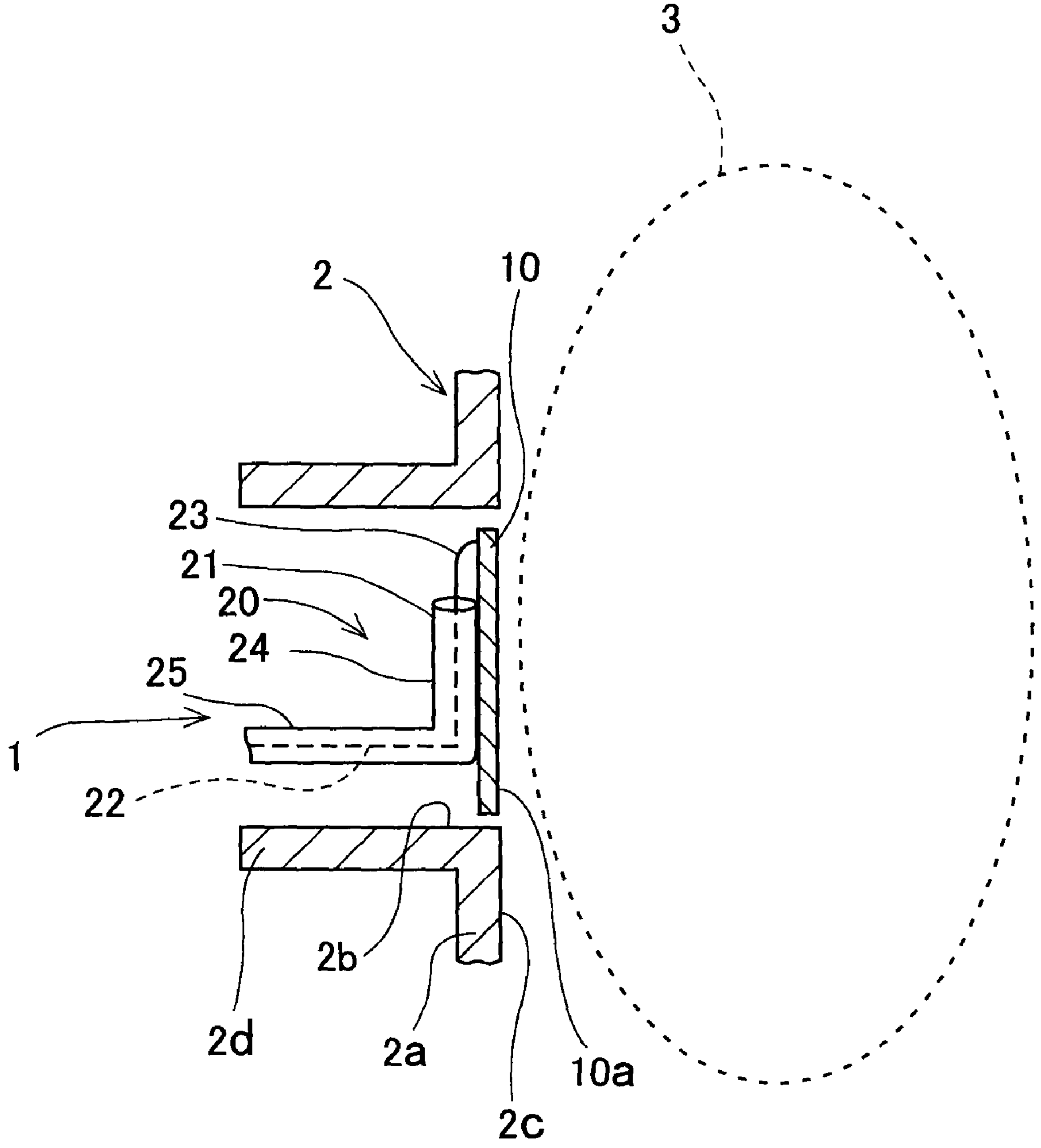
FIG. 2 is a schematic partial cross-sectional view for illustrating a method for measuring plasma electron densities by using the planar type frequency shift probe according to Embodiment No. 1.
Figure 3:
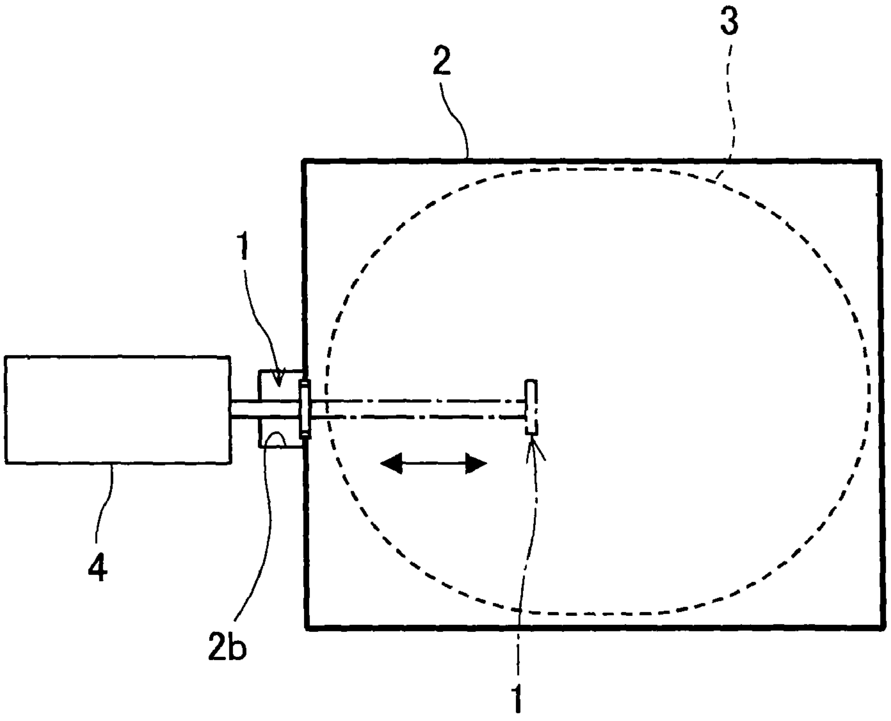
FIG. 3 is a diagram for explaining a method for measuring plasma electron densities by using the planar type frequency shift probe according to Embodiment No. 1.

The planar type frequency shift probe 1 according to this Embodiment ,as shown in FIGS. 1-3, has been devised to measure the electron density in a plasma 3 generated in a vessel 2, by use of the resonance of electromagnetic waves.

This planar type frequency shift probe 1 has a main body 10 comprising a flat metal plate as an electric conductor and a coaxial cable 20 which is electrically connected to one surface of the main body 10.

The abovementioned main body 10 has an almost rectangular shape which is obtained by cutting out a portion with a predetermined shape from a rectangular flat metal plate with a thickness of 0.1-1 mm. This main body 10 has a long narrow space 11 with a width d and a length L, in which one of the both ends of the space has an opening on the periphery of the main body 10. This long narrow space 11 is formed by cutting out a portion of the main body 10 from the periphery of the main body 10 toward the inside, so that the cut-out length can be considerably larger than the cut-out width.

The long narrow space 11 extends longitudinally in a long straight line, from the periphery on one longitudinal (left-and-right direction in FIG. 1) end (left side in FIG. 1) of the main body 10 toward the other end(right side in FIG. 1). And, the long narrow space 11 is located in the vicinity of one lateral side(upper side in FIG. 1) of the main body 10. Moreover, the long narrow space 11 has a U-shape configuration.

As described hereinafter, the width of the long narrow space 11 is determined, based on the sheath thickness decided by plasma electron density and electron temperature, while the length of the long narrow space 11 is determined by the plasma electron density to be measured, the desired measurement precision and the resonant frequency where the desired precision is attainable.

The width d of the long narrow space 11 is designed to be larger than the thickness (several mm) of a sheath generated around the second surface part 13 which will be described hereinafter.

From a viewpoint to favorably introduce a plasma into the long narrow space 11, the width d of the long narrow space 11 is preferred to be significantly larger than the sheath thickness which is decided by electron density and electron temperature. In plasmas used for usual material processes, the value of d is preferred to be more than several mm.

And, from the consideration described hereinafter the length L of the long narrow space 11 is preferred to be larger than a certain value which depends on the electron density no to be measured and the desired measurement precision. Namely, as seen from the aforementioned equation (4), $$f_r^2=f_0^2+f_p^2 \quad (4)$$

the resonant frequency $f_r$ at the electron density $n_0$ is shifted to a higher value from the resonant frequency $f_0$ at zero electron density by the amount of electron plasma frequency $f_p$.

Here, when $n_0=0$, $\epsilon=1$ is derived from the aforementioned equation (2). Substitution of this value into the aforementioned equation (1) yields the following equation.

$$f_0=c/(4L) \quad (6)$$

This equation shows that the value of $f_0$ is determined only by length L. On the contrary, $f_p$ is not determined by L but it is determined only by electron density $n_0$. Therefore, as seen from equation (4), when $f_p$ determined by electron density no to be measured, is significantly small, compared with $f_0$ determined by length L, the frequency shift due to a plasma becomes very small. This lowers the measurement precision and finally makes the measurement impossible. From the above description, it is shown that for larger $f_0$ values against $f_p$, the frequency shift to be observed becomes smaller, leading to increased difficulty in the measurement. If the condition, as shown in equation (7) is assumed as the minimum requirement for measurements with practically allowable precisions, $$f_0<10f_p \quad (7)$$

equation (8) will be derived from equations (6) and (7).

$$L>(\pi c/20)\,(m_e\epsilon_0/e^2n_0)^{1/2} \quad (8)$$

The value of L to satisfy equation (8) will make it possible to measure with allowable precisions.

The aforementioned main body 10 comprises the first surface part 12 and the second surface part 13, which face each other across the aforementioned long narrow space 11 in the width direction of the long narrow space 11 (in the lateral direction of the antenna main body 10) and a connecting part 14 (indicated by slash lines in FIG. 1) which integrates the first surface part 12 and the second surface part 13. Namely, the main body 10 comprises a connecting part 14 adjacent to the dead end 11*a* of the long narrow space 11 and the first surface part 12 and the second surface part 13 which are separated by the connecting part 14 and yet mechanically integrated with the connecting part 14. In addition, the first surface part 12 is nearer to the center of the main body 10 than the connecting part 14 (the center of the main body 10 is within the first surface part 12).

The above-mentioned first surface part 12 is designed to have a larger area than the above-mentioned second surface part 13 which extends in a long narrow belt configuration. From a viewpoint to favorably secure the mechanical strength of the probe by the first surface part 12 with a larger area, the area of the first surface part 12 is preferably more than two times larger than that of the second surface part 13, more preferably more than five times, and most preferably more than eight times. In this embodiment, the area of the first surface part 12 is designed to be almost ten times as large as that of the second surface part 13.

The coaxial cable 20 is a so-called semi-rigid cable and comprises a surface conductor (copper pipe) 21 and a core conductor 22 which is embedded in a dielectric material (polyethylene) filled within the surface conductor 21. In this embodiment, the outer diameter of the coaxial cable 20 is designed to be 3 mm.

And, the surface conductor 21 of the coaxial cable 20 is electrically connected to the first surface part 12, while the core conductor 22 of the coaxial cable 20 is electrically connected to the second surface part 13. More specifically, in the vicinity of the opposite end of the long narrow space 11 (around the dead end 11*a* at the bottom of the U-shape space), the tip of the surface conductor 21 is fixed by soldering to the first surface part 12 at point G, while the lead wire 23 extending from the tip C of the core conductor 22 is fixed to the second surface part 13 at point A. In this case, the lead wire 23 may be integrated with the core conductor 22.

And, the coaxial cable 20 comprises a vertical part 24 extending vertically in parallel to the first surface part 12 and a horizontal part 25 extending horizontally at a right angle to the first surface part 12 (see FIGS. 1 and 2). In addition, the length of the vertical part 24 of the coaxial cable 20 is designed to be smaller than the width of the first surface part 12. Accordingly, the coaxial cable 20 is situated so that the surface conductor 21 can be housed within the projection area of the first surface part 12.

Figure 21:
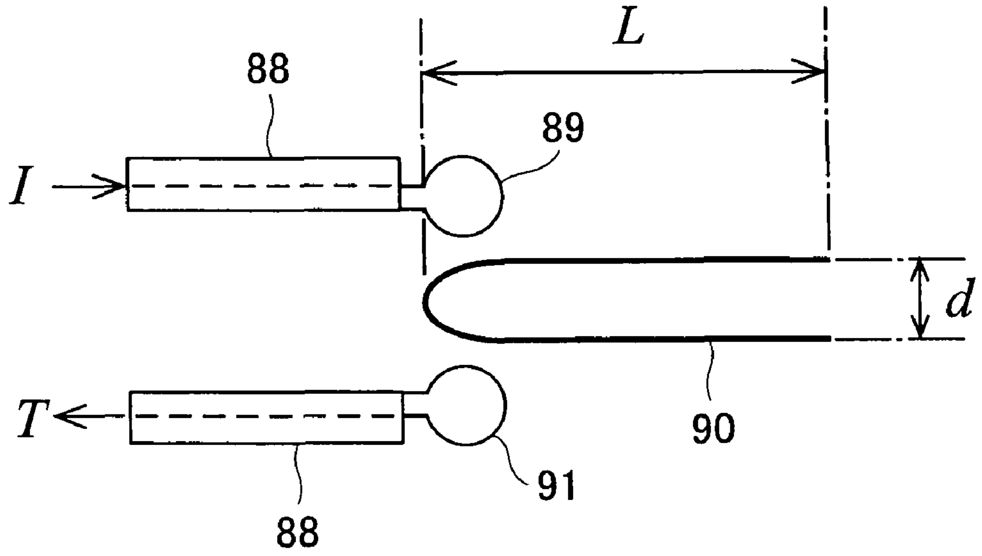
FIG. 21 is a diagram for explaining a conventional method for measuring plasma electron densities by use of a U-shape wire type frequency shift probe with two coaxial cables.
Figure 22:
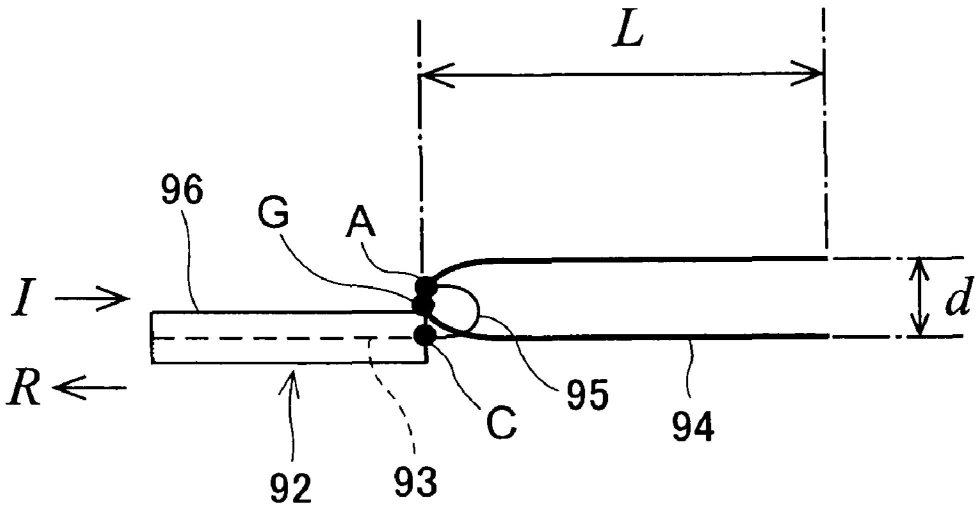
FIG. 22 is a diagram for explaining a conventional method for measuring plasma electron densities by use of a U-shape wire type frequency shift probe with one coaxial cable.

When the coaxial cable 20 is electrically connected to the main body 10 in the manner as described above, an electrical current loop CAG is formed by the tip C of the core conductor 23, point A where the tip of the lead wire 23 is fixed to the second surface part 13, the connecting part 14 and point G where the tip of the surface conductor 21 is fixed to the first surface part 12. This electrical current loop CAG is equivalent to the micro loop antenna of the aforementioned U-shape wire type frequency shift probe and performs the same function as the transmitting loop 89 in FIG. 21.

Figure 23:
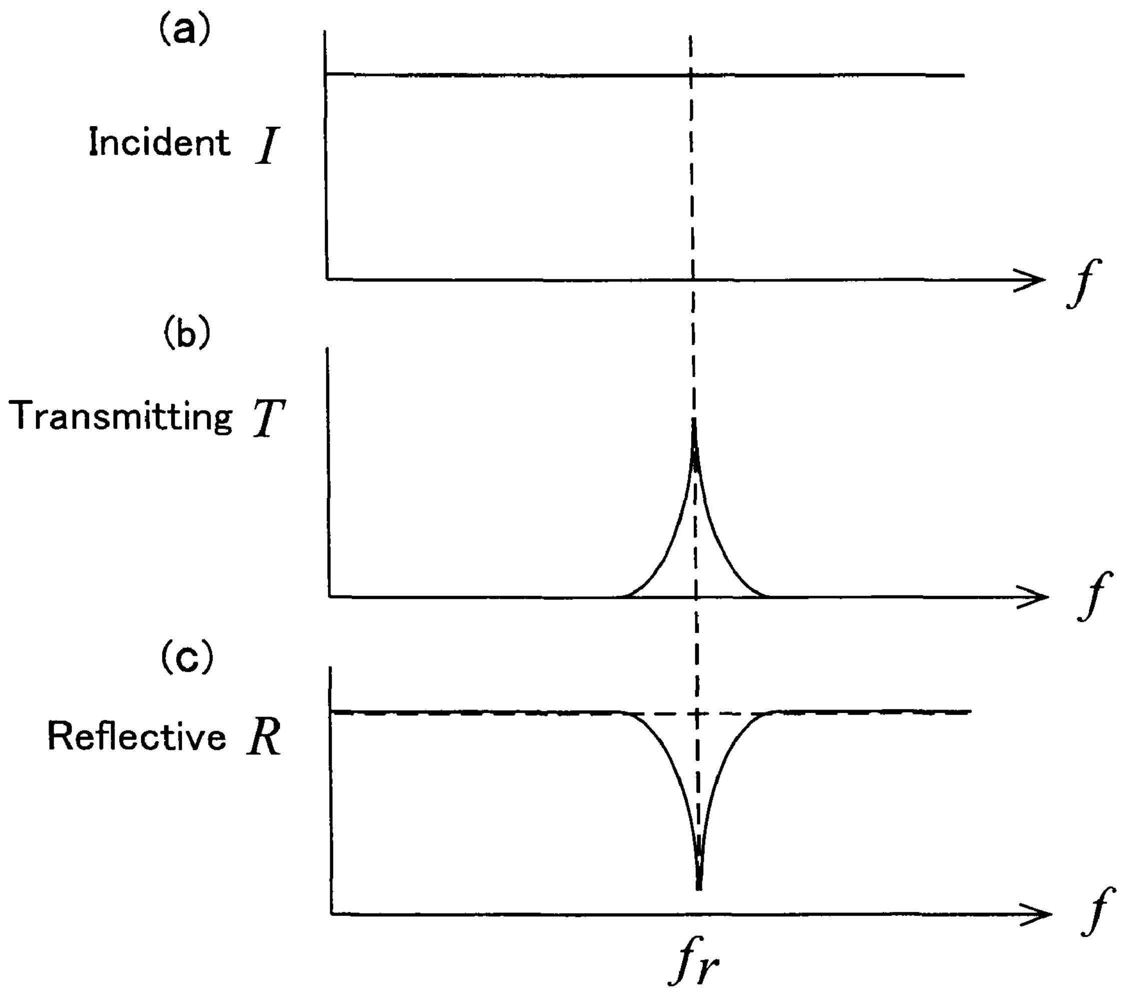
FIG. 23 is a graph for illustrating the relationship between frequency and either of incident power I, transmitting power T and reflective power R.

Namely, the incident power I, emitted from a network analyzer 4 (see FIG. 3) with a function as a power source and transmitted to the electric current loop CAG via the core conductor 22 of the coaxial cable 20, is used to excite the main body 10, while the rest of the power is, as the reflective power R, sent back to the power source via the surface conductor 22 of the coaxial cable 20. The electromagnetic waves excited by the electric current loop CAG are transmitted along the inner edges of the long narrow space 11 and when the waves satisfy the aforementioned resonance condition as shown in equation (1), the electromagnetic waves are resonantly and strongly excited. Since the reflective power R, returning to the power source via the coaxial cable 20, is decreased by the amount corresponding to this exciting power, the reflective power R drops at the frequency $f_r$, as shown in FIG. 23(*c*). More precisely, since the frequency $f_r$, is somewhat dependent on the shapes of the main body 10 and the electric current loop and other factors, the precise frequency value is required to be corrected by reference to the results of the electromagnetic field simulation.

The method for measuring plasma electron densities by using the planar type frequency shift probe 1 according to this embodiment will be described hereinafter.

FIGS. 2 and 3 are schematic diagrams for illustrating the construction of the apparatus for measuring plasma electron densities according to this embodiment.

As shown in FIG. 2, in this apparatus for measuring plasma electron densities, a tube 2*d* for inserting the probe is integrally installed on the side wall 2*a* of an almost cylindrical vessel 2 with a closed space in which a plasma is generated. The tube 2*d* provides a port hole 2*b* which connects the inside of the vessel 2 to the outside. And, the aforementioned planar type frequency shift tube 1 is inserted in this port hole 2*b* and the main body 10 is arranged along the inner wall surface 2*c* of the vessel 2. More specifically, the planar type frequency shift probe 1 is situated in the port hole 2*b*, so that the inner wall surface 2*c* of the vessel 2 can be flush with the opposite surface 10*a* (rear surface opposite to the aforementioned surface to which the coaxial cable 20 is fixed) of the main body 10. In addition, this apparatus has a network analyzer 4 which supplies the planar type frequency shift probe 1 with a high frequency electric power as an incident power I while sweeping frequencies and at the same time monitors the reflective power R returning from the planar type frequency shift probe 1 as well as a means for generating plasmas (not shown in FIGS.).

In this situation, an incident power I is supplied to the coaxial cable 20 from the network analyzer 4 as a power source, as shown in FIG. 3. As mentioned above, the electromagnetic waves excited by the electric current loop CAG are emitted from the long narrow space 11 toward a plasma 3. This network analyzer 4 has functions to send a minute amount of incident power I while sweeping frequencies to the main body 10 and at the same time to monitor the reflective power R returning from the main body 10. Accordingly, when the reflective power R is measured, the electron densities in the vicinity of the long narrow space 11 can be determined from equation (5), by utilizing the fact that the reflective power R drops resonantly at the resonant frequency $f_r$, as shown in FIG. 23(*c*).

In addition, if the planar type frequency shift probe 1 is moved forward and backward in the vessel 2, as shown by alternate long and short dash lines in FIG. 3, it is possible to measure the electron density distribution within the plasma 3. However, since the whole size of the main body 10 is large, a sheath is formed over the aforementioned opposite surface 10*a* of the main body 10. This is likely to lower local electron densities. In order to determine the electron densities before inserting the planar type frequency shift probe 1 in due consideration of the plasma disturbance by the probe, it is desirable to make prior measurement of the proper electron densities by use of a Langmuir probe and the like with little plasma disturbance and use the measurement results for proper correction.

On the other hand, if the planar type frequency shift probe 1 is arranged so that the inner wall surface 2*c* of the vessel 2 can be flush with the opposite surface 10*a* of the main body 10, the disturbance to the plasma 3 can be eliminated and the electron densities around the wall surface can be precisely measured.

As mentioned above, in the main body 10 of the planar type frequency shift probe 1 according to this embodiment, the first surface part 12, the second surface part 13 and the connecting part 14 are integrated in one plane. The surface conductor 21 of the coaxial cable 20 is connected to the first surface part 12, while the core conductor 22 of the coaxial cable 20 is connected to the second surface part 12. Accordingly, this probe is easier to fabricate and has a higher mechanical strength, compared with the aforementioned conventional U-shape wire type frequency shift probe.

In this planar type frequency shift probe 1, a high mechanical strength can be satisfactorily secured by the first surface part 12 with a considerably larger area than the second surface part 13. And, since the coaxial cable 20 is arranged so that the surface conductor 21 can be housed within the projection area of the first surface part 12 with a larger area, the surface conductor 21 can be securely shielded from the plasma 3.

When this planar type frequency shift probe 1 is installed for measurement within the port hole 2*b* so that the inner wall surface 2*c* of the vessel 2 can be almost flush with the opposite surface 10*a* of the main body 10, this planar type frequency shift probe 1 does not protrude into the plasma 3 during measurement. Accordingly, it is possible to securely prevent disturbance of a plasma 3 as well as mechanical damage to the planar type frequency shift probe 1. Therefore, this probe can be favorably used for measurement of plasma electron densities in volume production equipment.

Embodiment No. 2

Figure 4:
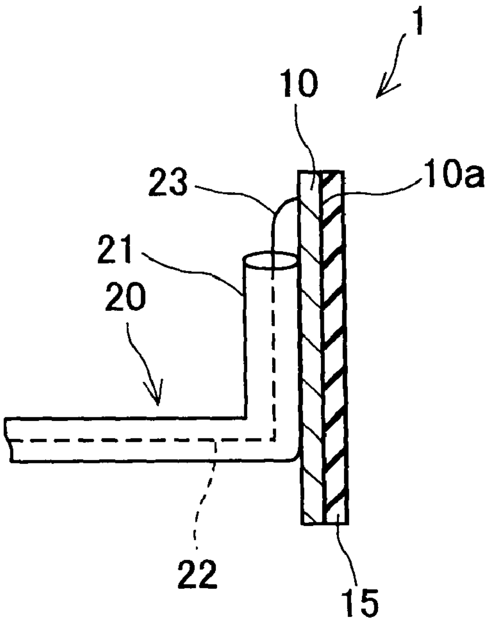
FIG. 4 is a schematic cross-sectional view for illustrating the construction of the planar type frequency shift probe according to Embodiment No. 2.

In the planar type frequency shift probe 1 according to this embodiment, as shown in FIG. 4, the aforementioned opposite surface 10*a* of the aforementioned main body 10 is coated with a thin dielectric film 15.

Accordingly, it is possible to prevent emission of metallic impurities from the main body 10 as well as contamination of the plasma 3 with metallic impurities.

From a viewpoint to more effectively prevent such metallic contamination, it is preferable to coat the entire main body 10 (however, except the electrical connection points with the coaxial cable 20 on the aforementioned one surface of the main body 10) with a thin dielectric film 15.

Other constructions and functions of this embodiment are the same as in Embodiment No. 1. Therefore, their repetitive description is omitted here, since the description of Embodiment No. 1 is applicable to this embodiment.

Embodiment No. 3

Figure 5:
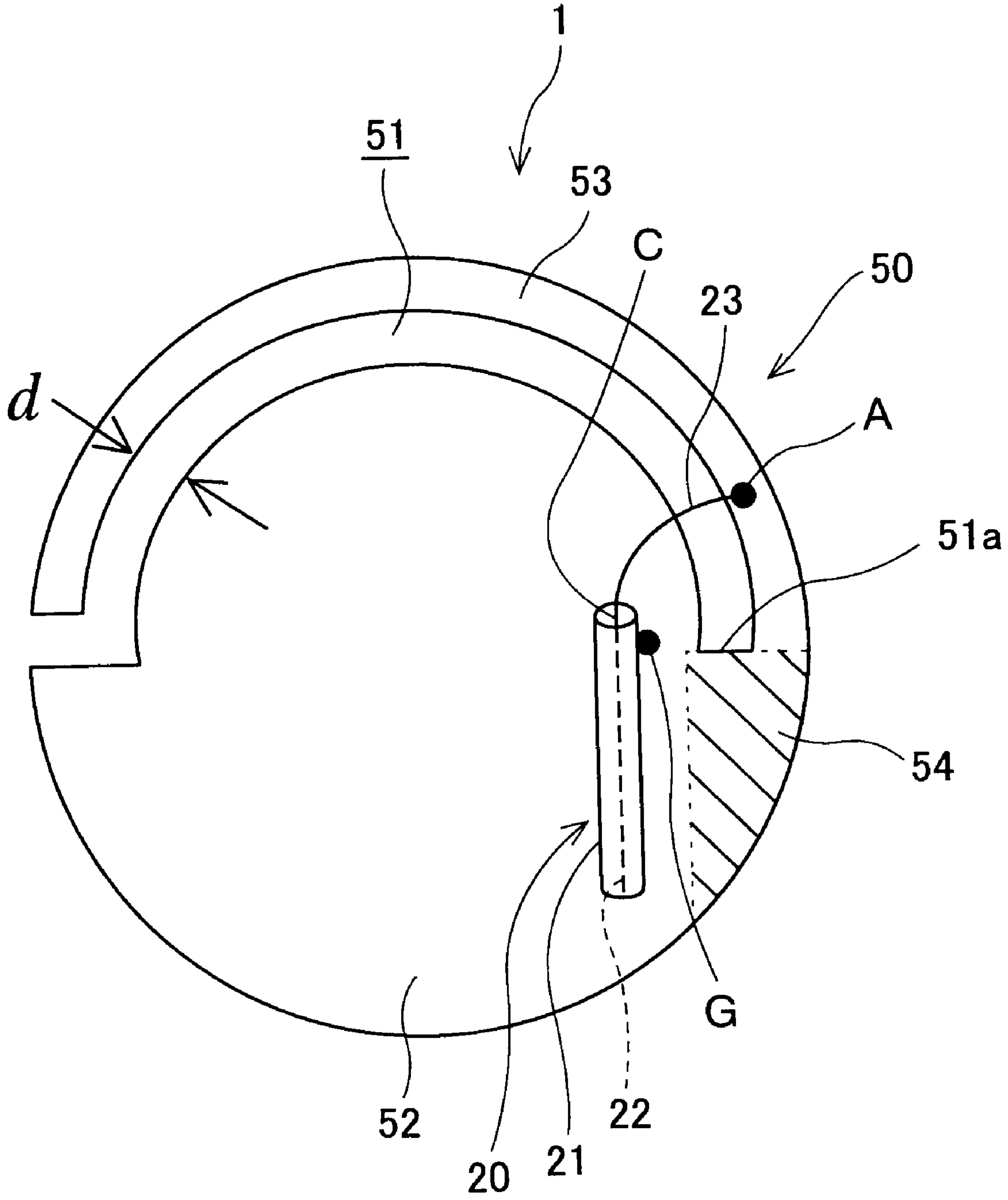
FIG. 5 is a schematic plane view for illustrating the entire construction of the planar type frequency shift probe according to Embodiment No. 3.

The planar type frequency shift probe 1 according to this embodiment, as shown in FIG. 5, has a main body 50 with an almost circular shape as a whole, which is obtained by cutting out a portion with a predetermined shape from a circular (truly circular) metallic flat plate. Namely, this main body 50 has a long narrow space 51 with predetermined width d and length L, in which one of the both ends of the space has an opening on the periphery of the main body 50. This long narrow space 51 is formed by cutting out a long narrow portion from the periphery of the main body 50 inward, so that the cut length can be considerably larger than the cut width.

The long narrow space 51 extends from the periphery of the main body 50 inward in a circular (semi-circular) arc configuration. And, this long narrow space 51 is formed at a position near to the periphery of the main body 50.

The width d of the long narrow space 51 is designed to be larger than the thickness (several mm) of a sheath formed around the second surface part 53, as described later.

The main body 50 comprises the first surface part 52 and the second surface part 53, which face each other across the above-mentioned long narrow space 51 in the lateral direction of the long narrow space 51 (in the radial direction of the main body 50) as well as a connecting part 54 (area indicated by slant lines in FIG. 5) which integrally connects the first surface part 52 and the second surface part 53. Namely, the main body 50 comprises the connecting part 54 adjacent to the dead end 51a of the long narrow space 51 as well as the first surface part 52 and the second surface part 53 which are separated by the connecting part 54 and yet integrated by the connecting part 54. In addition, the first surface part 52 is arranged nearer to the center of the main body 50 than the connecting part 54 (the center of the main body 50 is within the first surface part 52).

The above-mentioned first surface part 52 is designed to have a larger area than the above-mentioned second surface part 53 which extends in a long narrow semi-circular strip configuration.

Other constructions are the same as in the aforementioned Embodiment No. 1. Accordingly, this embodiment provides basically the same functions as the aforementioned Embodiment No. 1. Therefore, their repetitive description is omitted here, since the description of embodiment No. 1 is applicable to this embodiment.

Embodiment No. 4

Figure 6:
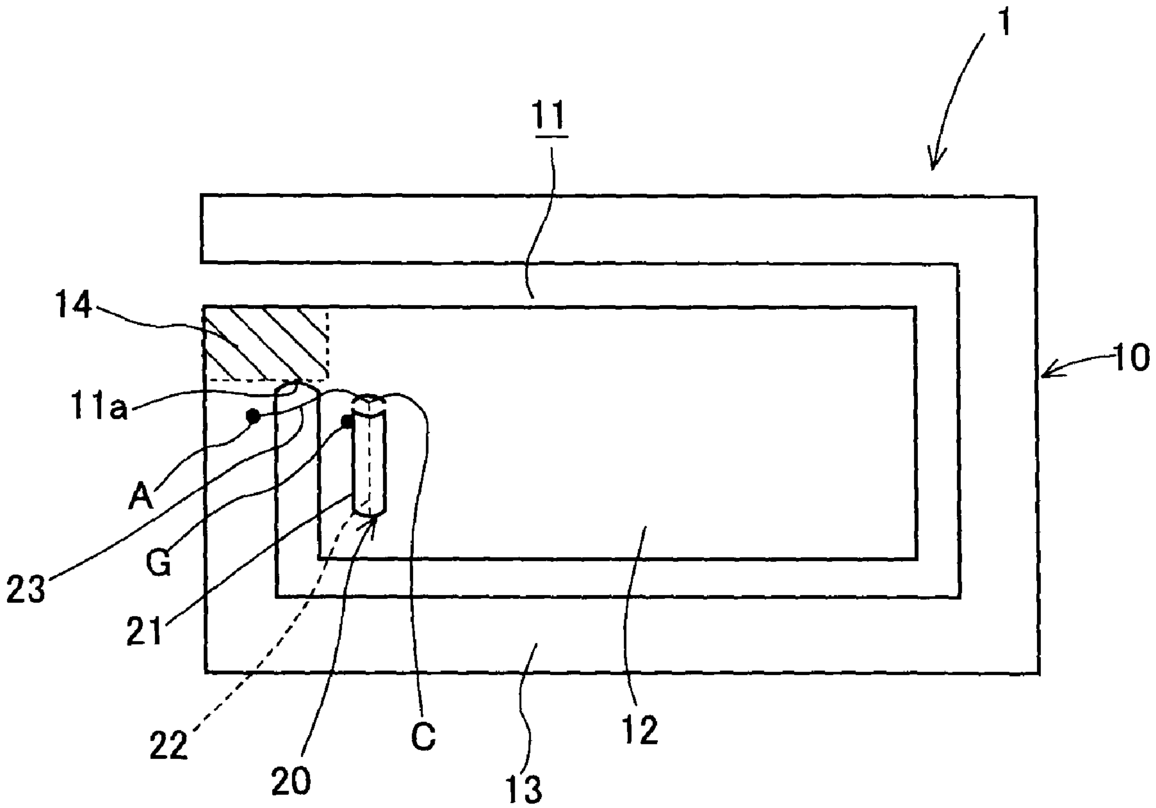
FIG. 6 is a schematic plane view for illustrating the entire construction of the planar type frequency shift probe according to Embodiment No. 4.

In the planar type frequency shift probe 1 according to this Embodiment, as shown in FIG. 6, the long narrow space 11, as described in the aforementioned embodiment No. 1, is designed to extend continually along the four sides of the almost rectangular main body 10 to make almost one round of the main body 10, with a purpose to lengthen the long narrow space 11.

Accordingly, since the planar type frequency shift probe 1 according to this embodiment has a longer length L in the long narrow space 11 than the planar type frequency shift probe 1 according to Embodiment No. 1, the resonant frequency $f_r$ can be lowered for the increased length L of the long narrow space 11. Therefore, when the resonant frequency $f_r$ is preferred to be lowered below a predetermined value, the main body 10 can be miniaturized while the length L of the long narrow space 11 necessary for measurement of plasma electron densities is maintained above a predetermined level.

Other constructions are the same as in the aforementioned Embodiment No. 1. Accordingly, this embodiment provides basically the same functions as the aforementioned Embodiment No. 1. Therefore, their repetitive description is omitted here, since the description of Embodiment No. 1 is applicable to this embodiment.

Embodiment No. 5

Figure 7:
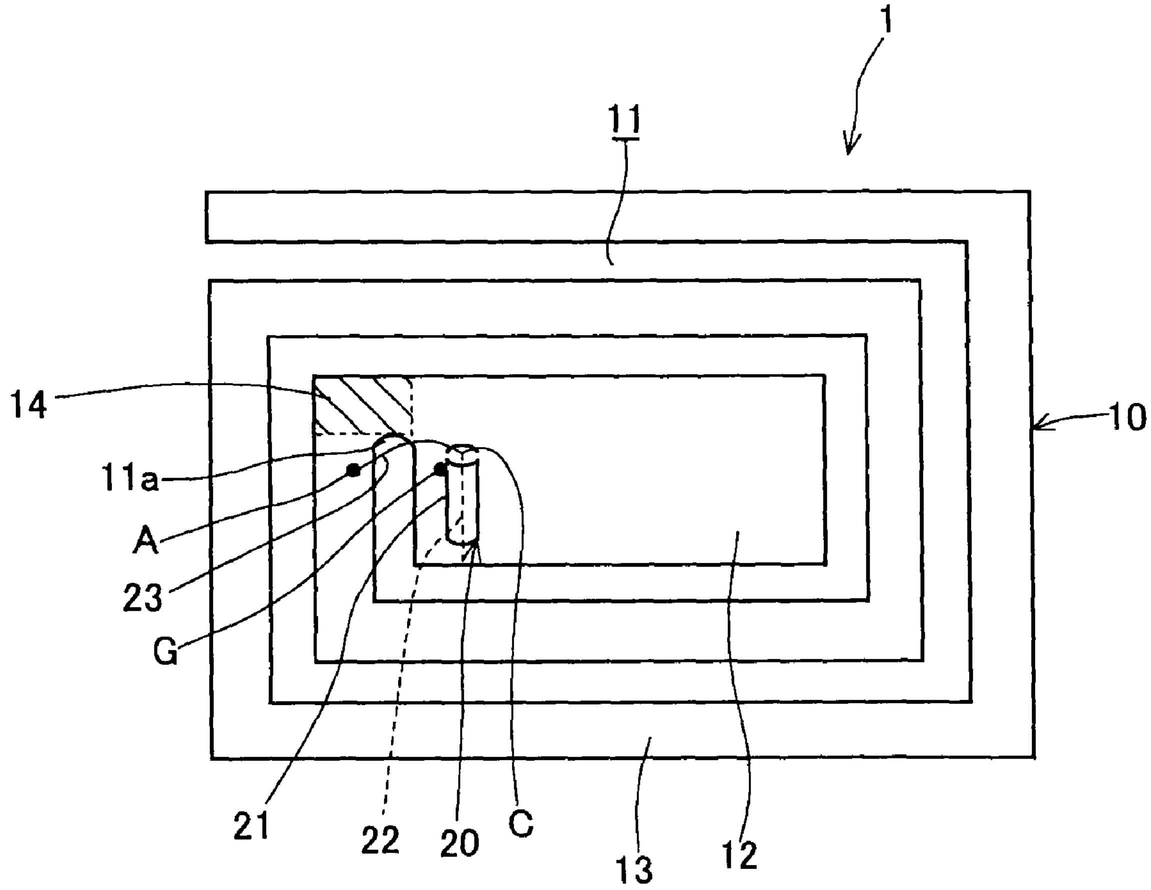
FIG. 7 is a schematic plane view for illustrating the entire construction of the planar type frequency shift probe according to Embodiment No. 5.

The planar type frequency shift probe 1 according to this embodiment, as shown in FIG. 7, is designed to have a longer narrow space 11, compared with the long narrow space 11 in Embodiment No. 1, which continually extends along the four sides of the rectangular main body 10, to make almost two rounds of the main body 10.

The main body 10 according to this embodiment comprises a connecting part 14 adjacent to the dead end 11*a* of the long narrow space 11 as well as the first surface part 12 and the second surface part 13 which are separated by the connecting part 14 and yet integrated by the connecting part 14. The first surface part 12 is situated nearer to the center of the main body 10 than the connecting part 14 (the center of the main body 10 is within the first surface part 12).

And, the long narrow space 11 comprises a series of rectilinear spaces which extend spirally from the periphery of the main body 10 to the center of the body (to make almost two rounds of the main body 10). Such spiral design of the long narrow space 11 makes it easy to lengthen the long narrow space 11, irrespective of the size of the main body 10.

Thus, the planar type frequency shift probe 1 according to this embodiment, has a long narrow space 11 with a longer length L than the planar type frequency shift probe 1 according to Embodiments No. 1 and No. 4. Therefore, the resonant frequency $f_r$ can be more effectively lowered for the increased length L of the long narrow space 11. Accordingly, when it is preferred to lower the resonant frequency $f_r$ below a predetermined value, it is possible to more effectively miniaturize the main body 10 while maintaining the length L of the long narrow space 11 necessary for plasma electron density measurement above a predetermined value.

Here, the number of rounds of the spirally extending long narrow space 11 is not specifically limited. Yet, if the length L of the long narrow space 11 is more lengthened with increased number of rounds, the main body 10 can be more effectively miniaturized.

Other constructions are the same as in the aforementioned Embodiment No. 1. Accordingly, this embodiment provides basically the same functions as the aforementioned Embodiment No. 1. Therefore, their repetitive description is omitted here, since the description of Embodiment No. 1 is applicable to this embodiment.

Embodiment No. 6

Figure 8:
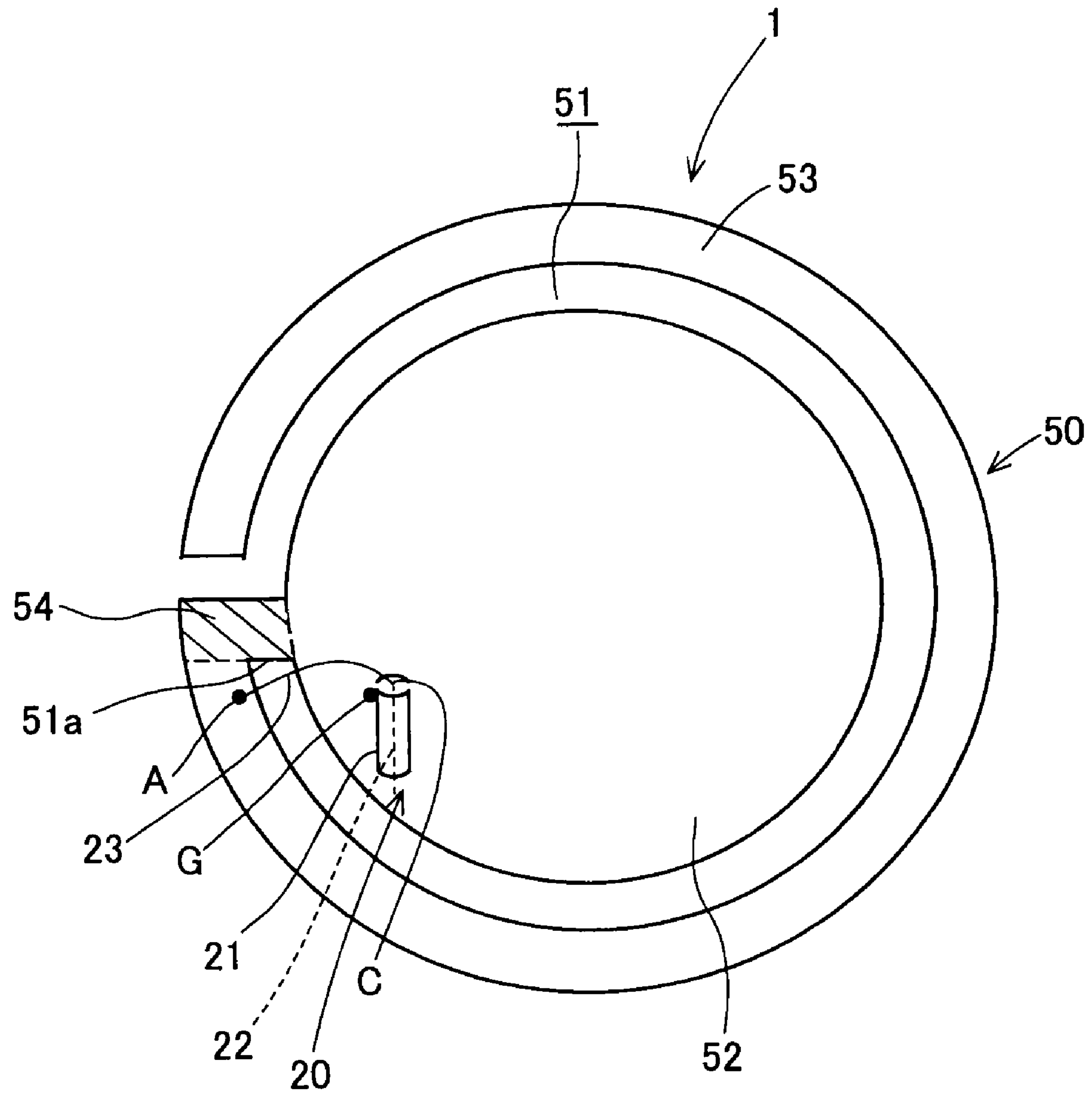
FIG. 8 is a schematic plane view for illustrating the entire construction of the planar type frequency shift probe according to Embodiment No. 6.

The planar type frequency shift probe 1 according to this embodiment, as shown in FIG. 8, is designed to have a longer narrow space 51, compared with the long narrow space 51 in Embodiment No. 3, which continually extends along the circumference of the almost circular main body 50, to make almost one round of the main body 50.

Accordingly, in the planar type frequency shift probe 1 according to this embodiment, the resonant frequency $f_r$ can be lowered for the increased length L of the long narrow space 51, compared with the planar type frequency shift probe 1 according to Embodiment No. 3. Accordingly, when it is preferred to lower the resonant frequency $f_r$ below a predetermined value, it is possible to miniaturize the main body 50 while maintaining the length L of the long narrow space 51 necessary for plasma electron density measurement above a predetermined value.

Other constructions are the same as in the aforementioned Embodiment No. 1. Accordingly, this embodiment provides basically the same functions as the aforementioned Embodiment No. 1. Therefore, their repetitive description is omitted here, since the description of Embodiment No. 1 is applicable to this embodiment.

Embodiment No. 7

Figure 9:
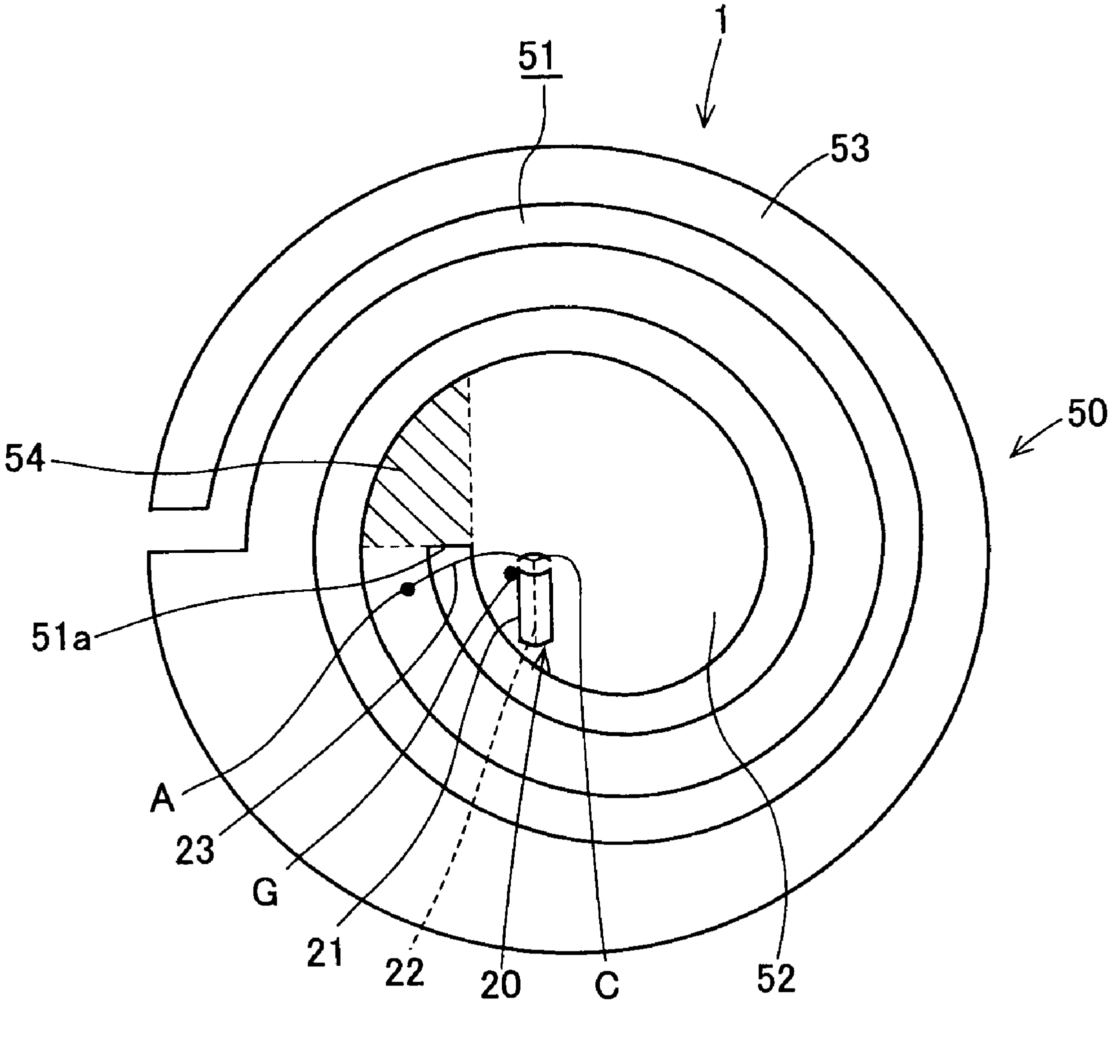
FIG. 9 is a schematic plane view for illustrating the entire construction of the planar type frequency shift probe according to Embodiment No. 7.

The planar type frequency shift probe 1 according to this embodiment, as shown in FIG. 9, is designed to have a longer narrow space 51, compared with the long narrow space 51 in Embodiment No. 3, which continually extends along the circumference of the almost circular main body 50, to make almost two rounds of the main body 50.

The main body 50 according to this embodiment comprises a connecting part 54 adjacent to the dead end 51*a* of the long narrow space 51 as well as the first surface part 52 and the second surface part 53 which are separated by the connecting part 54 and yet integrated by the connecting part 54. The first surface part 52 is situated nearer to the center of the main body 50 than the connecting part 54 (the center of the main body 50 is within the first surface part 52).

And, the long narrow space 51 comprises a curved space which extends spirally from the periphery of the main body 50 to the center of the body (to make almost two rounds of the main body 50). Such spiral design of the long narrow space 51 makes it easy to lengthen the length L of the long narrow space 51, irrespective of the size of the main body 50.

Thus, the planar type frequency shift probe 1 according to this embodiment, has a long narrow space 51 with a longer length L than the planar type frequency shift probe 1 according to Embodiments No. 3 and No. 6. Therefore, the resonant frequency $f_r$ can be more effectively lowered for the increased length L of the long narrow space 51. Accordingly, when it is preferred to lower the resonant frequency $f_r$ below a predetermined value, it is possible to more effectively miniaturize the main body 50 while maintaining the length L of the long narrow space 51 necessary for plasma electron density measurement above a predetermined value.

Here, the number of rounds of the spirally extending long narrow space 51 is not specifically limited. Yet, if the length L of the long narrow space 51 is more lengthened with increased number of rounds, the main body 50 can be more effectively miniaturized.

Other constructions are the same as in the aforementioned Embodiment No. 1. Accordingly, this embodiment provides basically the same functions as the aforementioned Embodiment No. 1. Therefore, their repetitive description is omitted here, since the description of Embodiment No. 1 is applicable to this embodiment.

Embodiment No. 8

Figure 10:
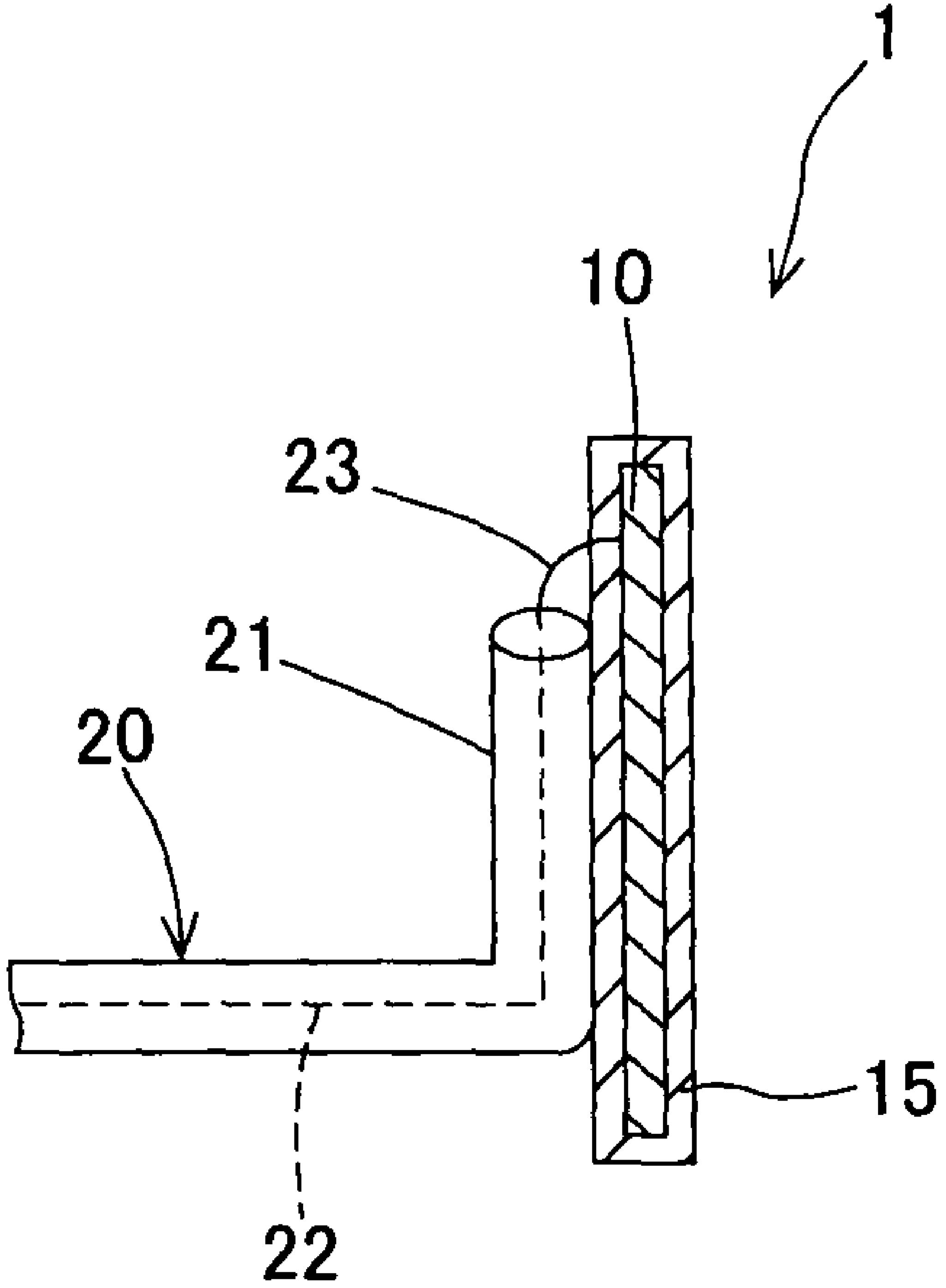
FIG. 10 is a schematic plane view for illustrating the entire construction of the planar type frequency shift probe according to Embodiment No. 8.

In the planar type frequency shift probe 1 according to this embodiment, as shown in FIG. 10, the entire surface of the aforementioned main body 10 (however, except the electrical connection points with a coaxial cable 20 on the aforementioned one surface of the main body 10) is coated with a thin dielectric film 15.

This thin dielectric film 15 was formed on the entire surface of the main body 10 by covering the main body 10 with alumina cloth (about 0.1 mm in thickness), followed by fixation with adhesive such as Aron Ceramic. In addition, a method was tried to make a thin dielectric film by melt spraying of alumina but the obtained film thickness was not uniform.

Accordingly, in the planar type frequency shift probe 1 according to this embodiment, when the resonant frequency $f_r$ is preferred to be lowered below a predetermined value, the main body 10 can be miniaturized while the dielectric constant $\in$ necessary for plasma electron density measurement is maintained above a predetermined level.

And, the thin dielectric film can securely prevent emission of metallic impurities from the main body 10 as well as contamination of a plasma 3 with metallic impurities.

Other constructions are the same as in the aforementioned Embodiment No. 1. Accordingly, this embodiment provides basically the same functions as the aforementioned Embodiment No. 1. Therefore, their repetitive description is omitted here, since the description of Embodiment No. 1 is applicable to this embodiment.

EXAMPLE

Simulation and experimental measurement results on the characteristics of the planar type frequency shift probe explained in the aforementioned Embodiment No. 3 will be described hereinafter.

Simulation Example No. 1 on the Characteristics of the Planar Type Frequency Shift Probe Electromagnetic field simulation on the frequency characteristics was carried out for the planar type frequency shift probe according to Embodiment No. 3 with a circular probe, 15 mm in radius, and the aforementioned long narrow space, 2 mm in width d, which is placed in a plasma with a uniform electron density $n_e$. The simulation results are shown in FIG. 11, which indicates the reflective power R, returning to the power source at point A in FIG. 5, from which microwaves are supplied at various frequencies.

Figure 11:
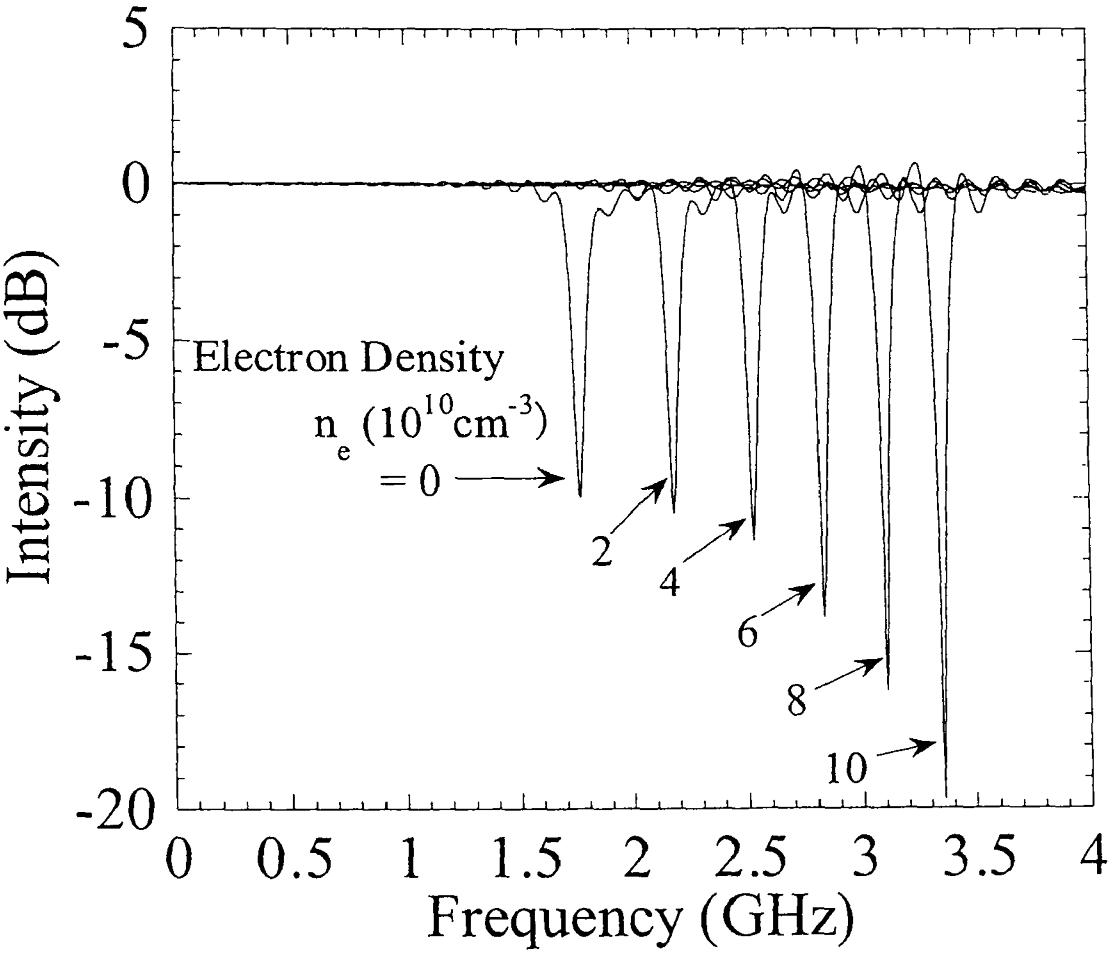
FIG. 11 is a graph for illustrating the frequency characteristics of the planar type frequency shift probe according to Embodiment No. 3, obtained from the results of electromagnetic field simulation for the probe.

FIG. 11 shows that the reflective power drops resonantly at 1.78 GHz in vacuum where the electron density is zero (in the absence of plasma) . The resonant frequency is shifted to higher values with higher electron densities; the frequency rises to 3.3 GHz at $n_e=10\times10^{10}$ cm$^{-3}$.

Figure 12:
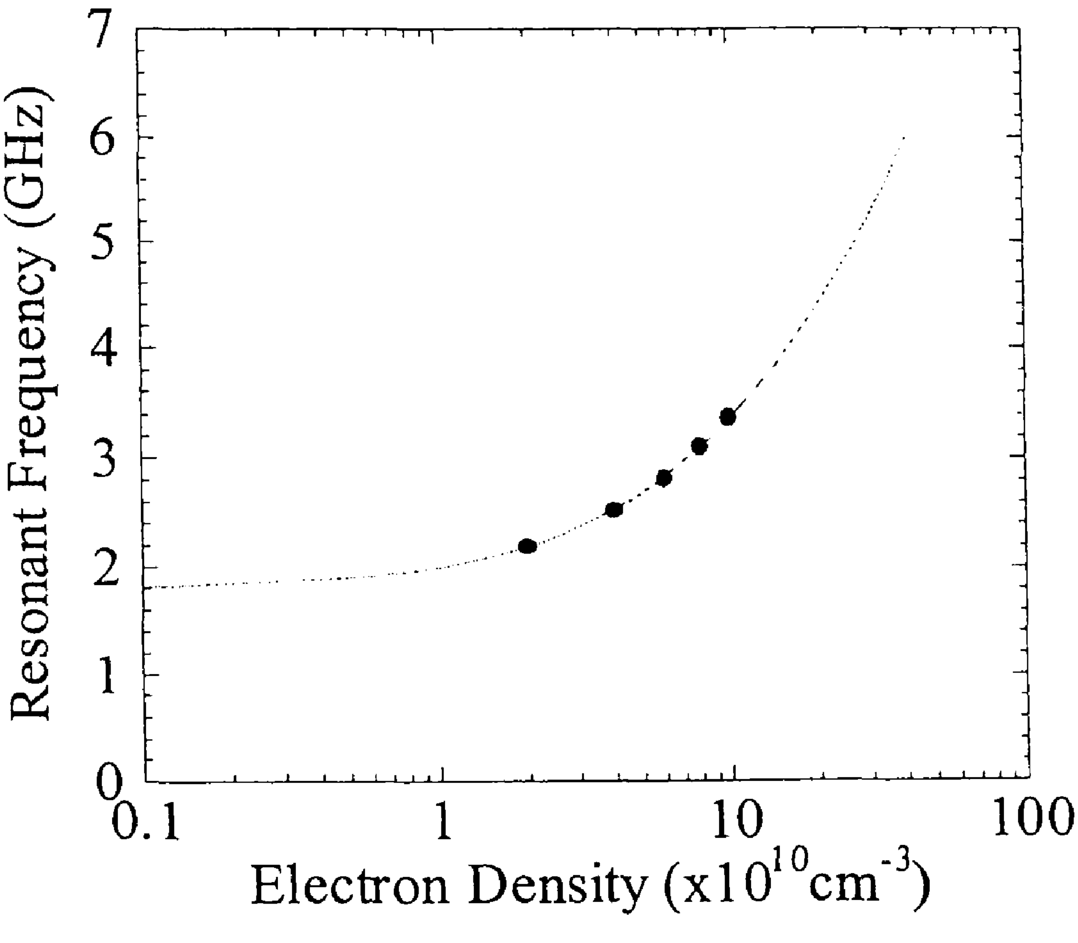
FIG. 12 is a plot for illustrating the relationship between electron density and resonant frequency, which are obtained by reading FIG. 11.

FIG. 12 is a plot of resonant frequencies against electron densities, both of which are obtained by a survey of FIG. 11. The continuous line in FIG. 12 represents the resonant frequencies predicted from equation (4) and this is in good agreement with the data points obtained in the above-mentioned simulation.

Simulation Example No. 2 on the Characteristics of the Planar Type Frequency Shift Probe When the main body of a frequency shift probe with an exposed metal surface is directly exposed to a plasma, the main body is likely to emit metal atoms as impurities. Since metallic contamination is never permitted especially in semiconductor production, it is required to coat the main body of the probe with a thin dielectric film. Simulation can be used to assess the effect of this thin dielectric film on the characteristics of the planar type frequency shift probe.

Figure 13:
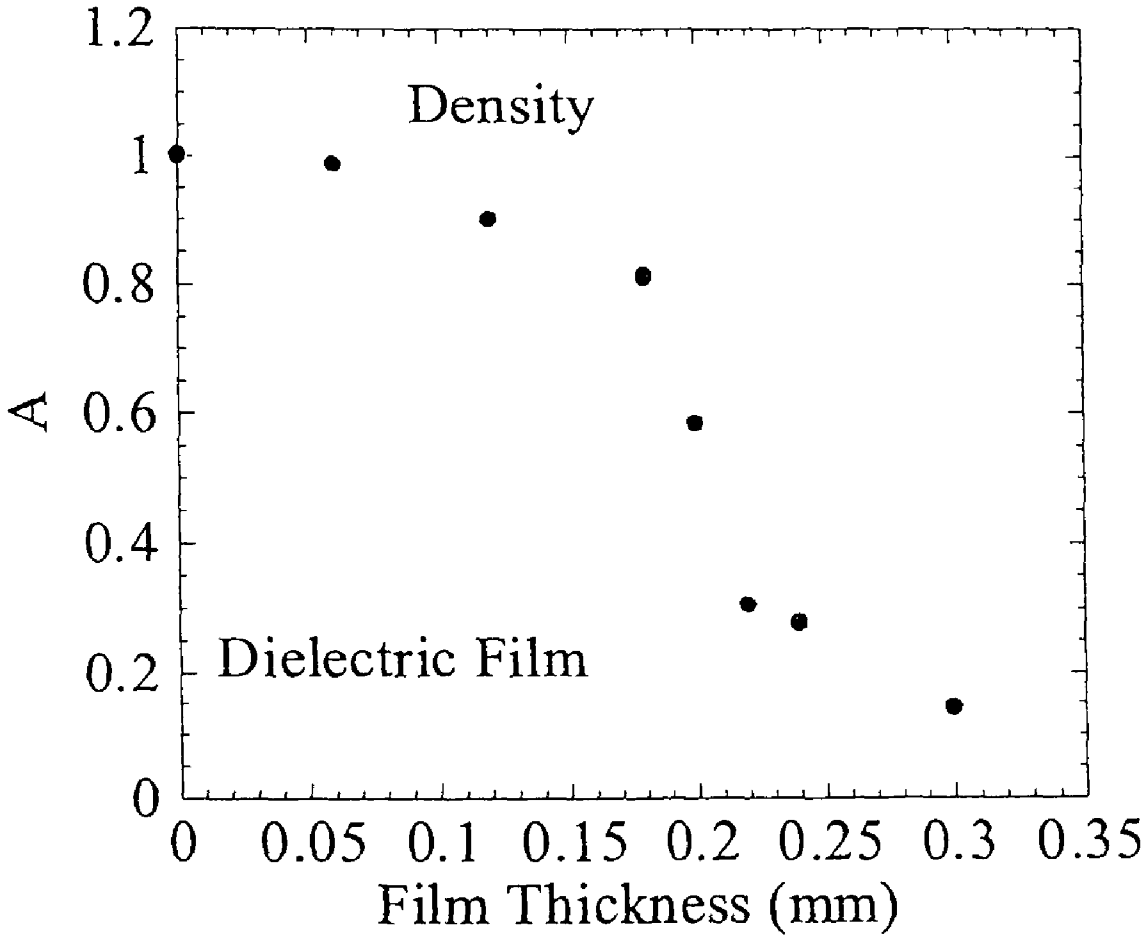
FIG. 13 is a graph for illustrating the effect of dielectric film on probe characteristics, obtained from simulation results for the planar type frequency shift probe according to Embodiment No. 3.
Figure 15:
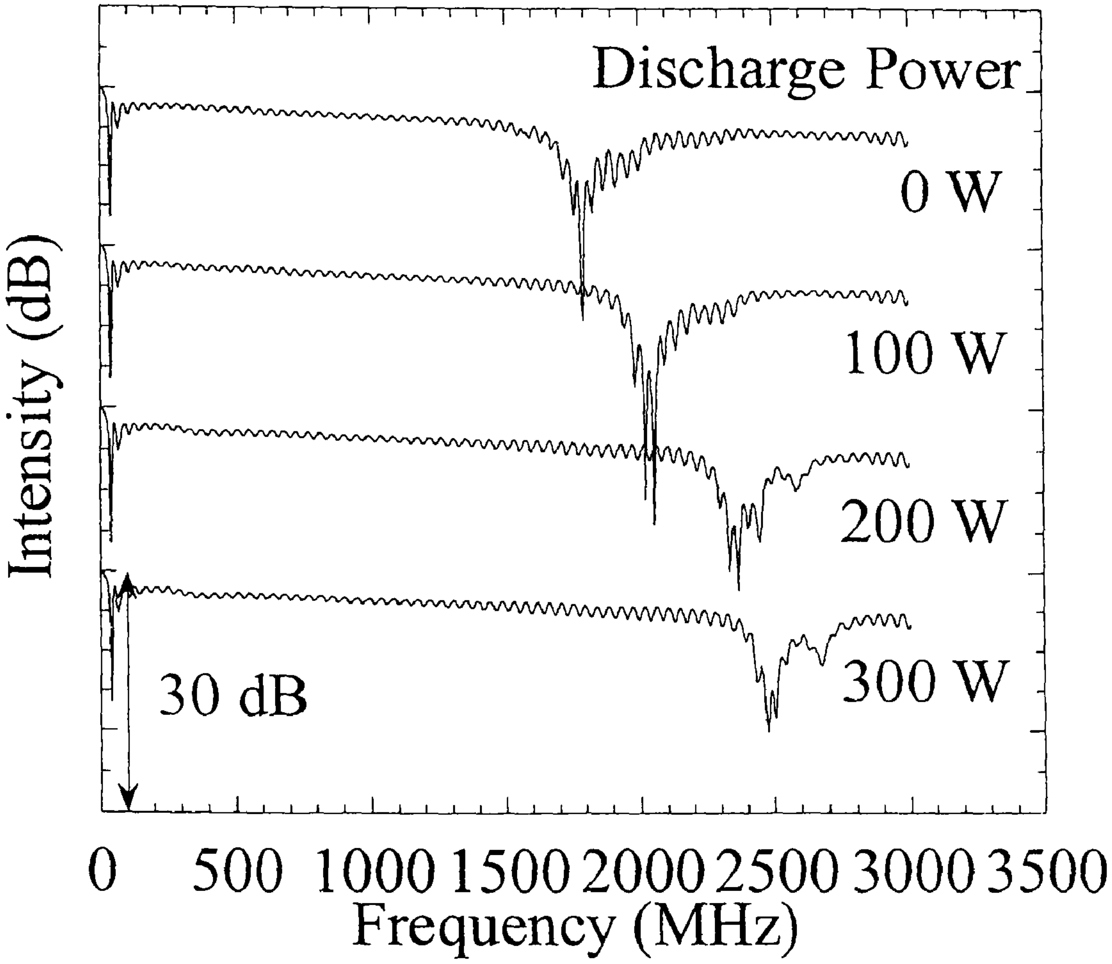
FIG. 15 is a graph for showing the experimental results on probe characteristics, for a planar type frequency shift probe according to Embodiment No. 3.

The probe characteristics as shown in a diagram similar to FIG. 15 are obtained by the simulation in which both sides of the same metallic circular plate (0.2 mm in thickness) as used in the above-mentioned Simulation Example No.1 are thinly coated with a dielectric material with a dielectric constant of 3 and the plate is used in a plasma with an electron density of $n_e=1\times10^{10}$cm$^{-3}$. Here, an apparent electron density $n_e$ is defined as the density value obtained from calculation by substituting the resonant frequency of the simulation into equation (5). And, A is defined as $A=n_a/n_e$, where $n_e$ is a correct electron density. FIG. 13 is a diagram to show how the A value changes with the thickness of the thin dielectric film.

From the results of this simulation, it can be seen that a correct electron density can be determined from equation (5) with a precision of 90%, if the dielectric film is thinner than 0.12 mm. For much thicker films, the simulation result of FIG. 13 is reversely used and a correct electron density $n_e$ is determined by dividing an apparent electron density $n_a$ by A.

Simulation Example No. 3 on the Characteristics of the Planar Type Frequency Shift Probe In general, when a body is inserted in a plasma, a boundary layer called a sheath is formed around the body. The sheath thickness is said to be several times as large as the Debye length which is decided by the electron density and electron temperature. Simulation was carried out for the planar type frequency shift probe by assuming that the boundary layer is a vacuum. In this computation, the dielectric constant used in the simulation, as shown in FIG. 13 of the above-mentioned Simulation Example No. 2 was assumed to be 1 and the thickness of the dielectric film was substituted for the sheath thickness. After arrangement of the results of the simulation where the electron temperature was assumed to be constant at 2.5 eV, the relation between A and electron density was obtained as shown in FIG. 14.

Figure 14:
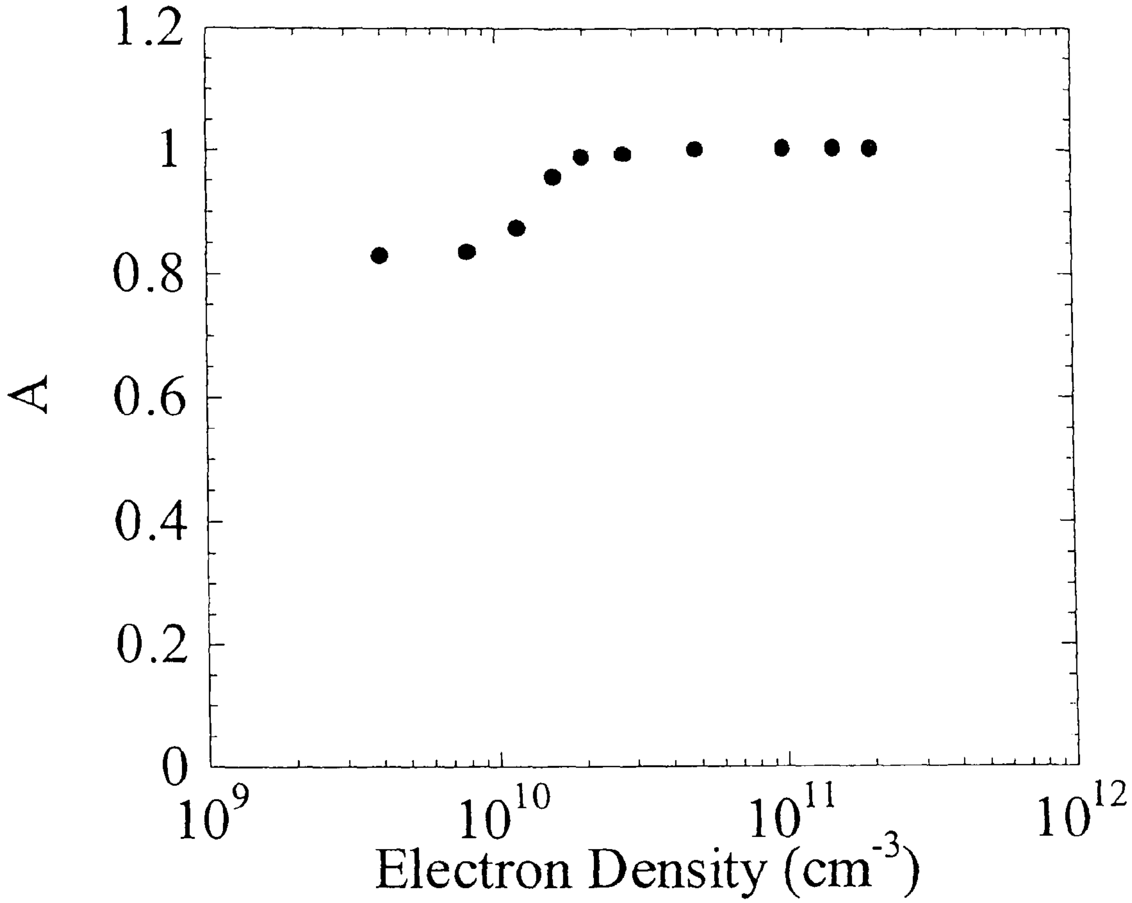
FIG. 14 is a graph for illustrating the effect of sheath thickness on probe characteristics, obtained from simulation results for a planar type frequency shift probe according to Embodiment No. 3.

FIG. 14 indicates that A=1 and there is no effect of the sheath for electron densities higher than $1\times10^{10}$ $cm^{-3}$. However, since the A value becomes smaller with lower electron densities below this level, the electron density is required to be corrected in consideration of the sheath effect.

Measurement Example on the Characteristic of the Planar Type Frequency Shift Probe Experiments were carried out by actual fabrication of the same circular shape planar type frequency shift probe as that used in the electromagnetic field simulation of FIGS. 11 and 12 in the aforementioned Simulation Example No. 1. A high frequency induction coupled plasma was generated in a cylindrical vessel with a diameter of 30 cm under an argon pressure of 20 mTorr. The fabricated planar type frequency shift probe was inserted in the plasma in the radial direction and placed at a distance of 9 cm from the central axis. And, the characteristics of the planar type frequency shift probe were measured by use of a network analyzes.

Figure 16:
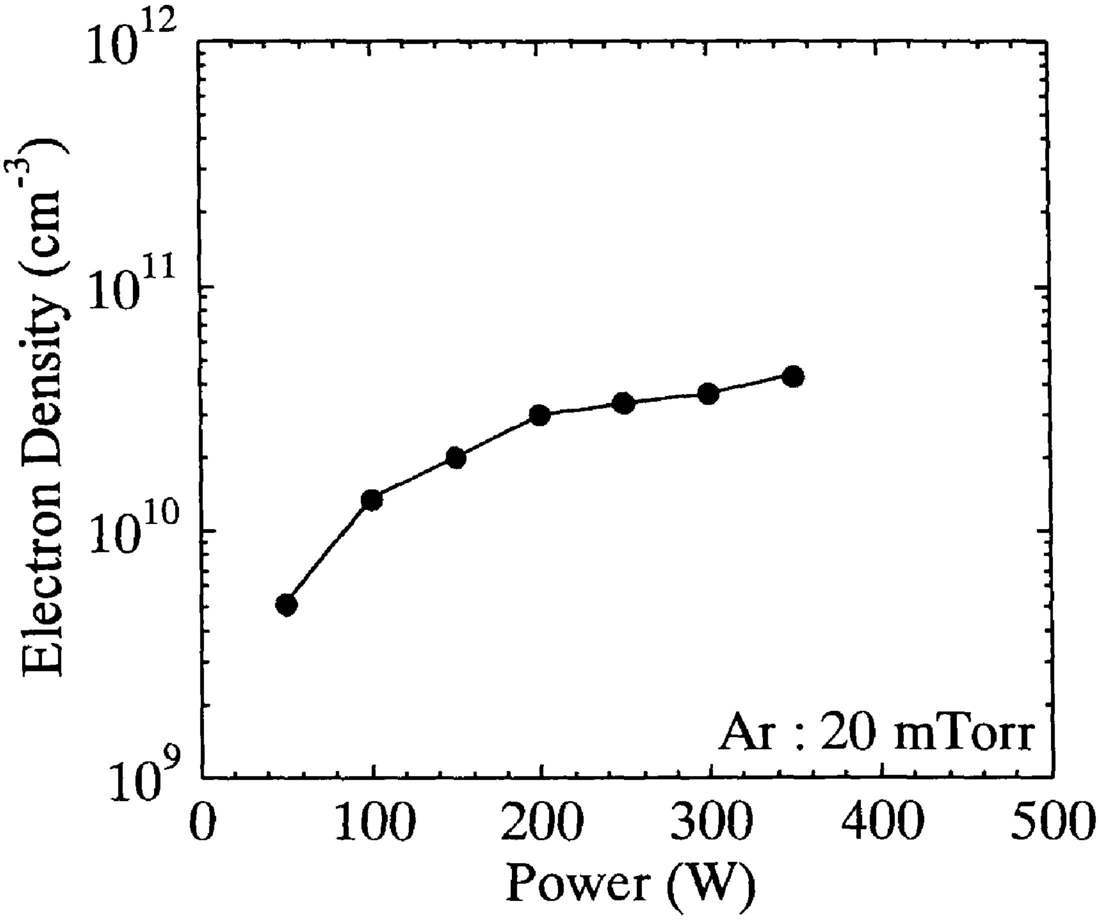
FIG. 16 is a graph for illustrating electron densities, obtained from calculation by use of equation (4) and resonant frequencies obtainable from FIG. 15.
Figure 17:
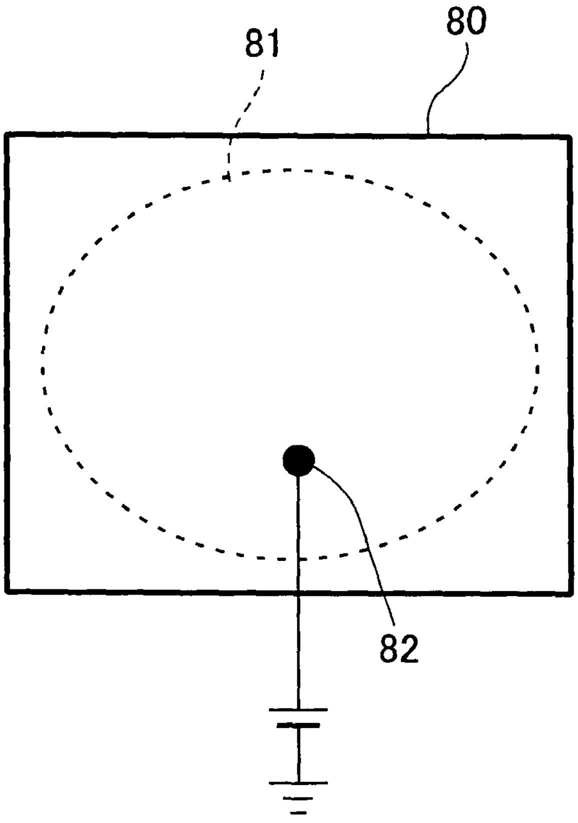
FIG. 17 is a diagram for explaining a conventional method for measuring plasma electron densities by use of a Langmuir probe.
Figure 18:
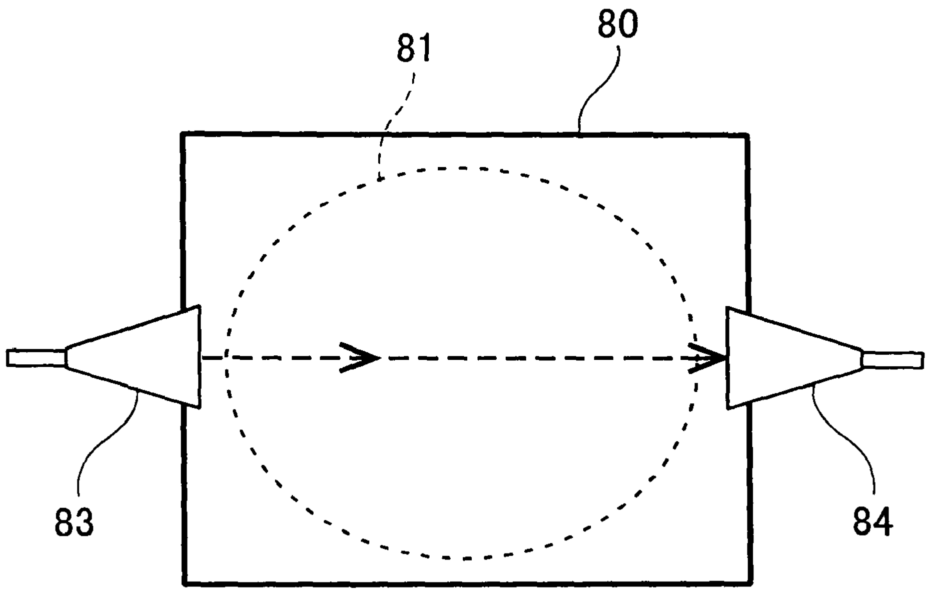
FIG. 18 is a diagram for explaining a conventional method for measuring plasma electron densities by use of a microwave interference method.
Figure 19:
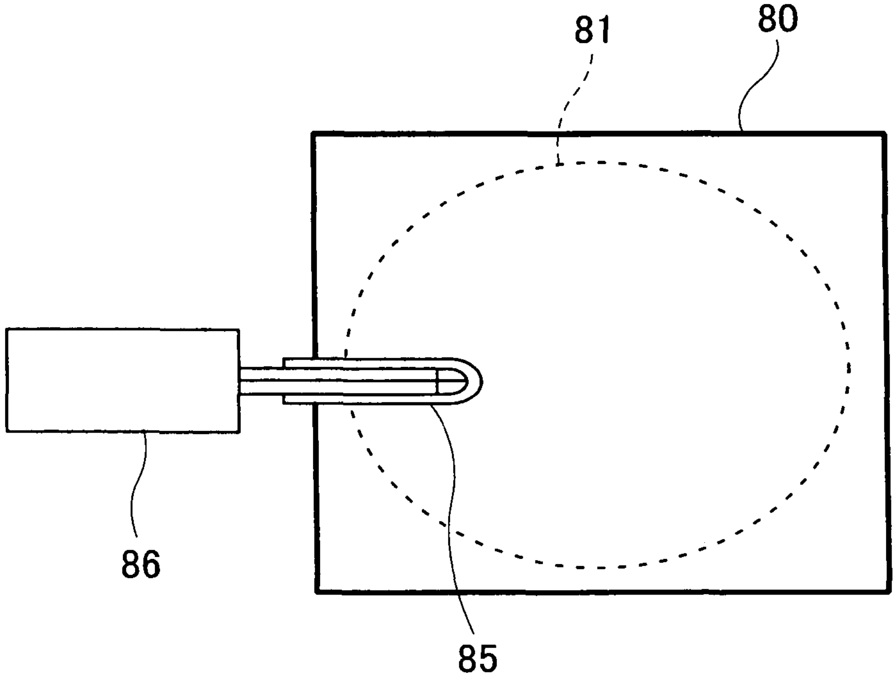
FIG. 19 is a diagram for explaining a conventional method for measuring plasma electron densities by use of a surface wave probe.
Figure 20:
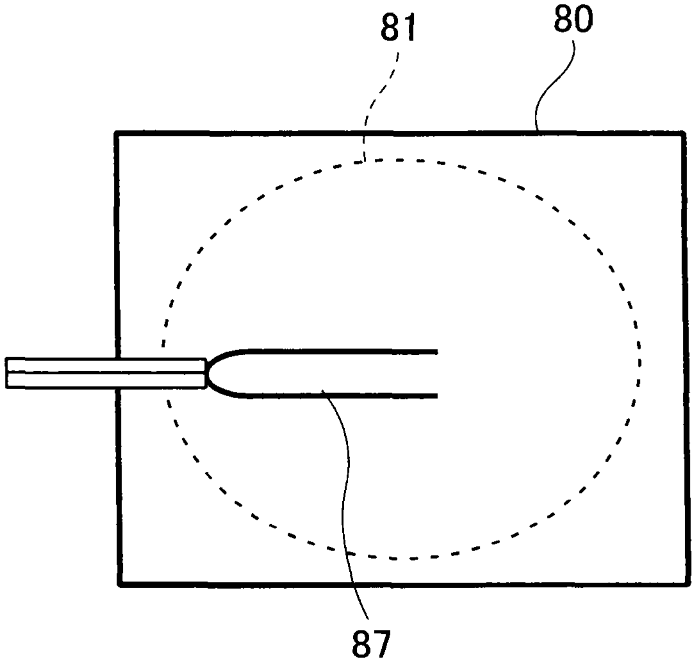
FIG. 20 is a diagram for explaining a conventional method for measuring plasma electron densities by use of a U-shape wire type frequency shift probe.

The measurement results are shown in FIG. 15. Since the resonant frequency at zero discharge power, namely, in vacuum, was 1.79 GHz, the experimental results are in good agreement with the aforementioned simulation results. It can be seen from the figure that with increased discharge power, the resonant frequency as well as the electron density tend to increase. FIG. 16 shows the electron densities which were obtained from these resonant frequencies by use of equation (5).

The invention claimed is:

1. A planar type frequency shift probe for measuring plasma electron densities, comprising a planar main body with a planar electrically conductive plate having an uncurved planar surface, the uncurved planar surface being a surface in which all lines normal to the surface, in any given area of the surface, are parallel to one another, and a coaxial cable formed by a surface conductor and a core conductor embedded in a dielectric material filled within said surface conductor, both of which are electrically connected to one surface of said planar main body, and measuring plasma electron densities in a vessel by use of the resonance of electromagnetic waves, wherein said planar main body comprises a connecting part adjacent to the dead end of a long narrow space, in which one of both ends of the space has an opening on the periphery of said planar main body and first and second surface parts of said planar main body which are separated by said connecting part and yet mechanically integrated by said connecting part, and said surface conductor of said coaxial cable is electrically connected to one of the first and second surface parts and said core conductor is electrically connected to the other of the first and second surface parts.

2. The planar type frequency shift probe for measuring plasma electron densities set forth in claim 1, wherein the width of said long narrow space is determined, based on a thickness of a sheath around the second surface part decided by the plasma electron density and electron temperature, and the length of said long narrow space is determined, based on the plasma electron density, and a resonant frequency decided by the plasma electron density at which a desirable precision is attainable.

3. The planar type frequency shift probe for measuring plasma electron densities set forth in claim 1, wherein said surface conductor of said coaxial cable is electrically connected to said first surface part and said core conductor of said coaxial cable is electrically connected to said second surface part, and said surface conductor of said coaxial cable is arranged to be housed within the projection area of said first surface part.

4. The planar type frequency shift probe for measuring plasma electron densities set forth in claim 1, wherein said long narrow space is formed by a rectilinear or curved space which spirally extends to the center from the periphery of said planar main body.

5. The planar type frequency shift probe for measuring plasma electron densities set forth in claim 1, wherein said planar main body has a thin dielectric film formed on the surface opposite to the surface electrically connected to said coaxial cable.

6. The planar type frequency shift probe for measuring plasma electron densities set forth in claim 1, wherein said planar main body has a thin dielectric film on its entire surface, except the electrical connecting points with said coaxial cable.

7. The planar type frequency shift probe for measuring plasma electron densities set forth in claim 1, wherein the width of said long narrow space is determined, based on a thickness of a sheath around the second surface part decided by the plasma electron density and electron temperature.

8. The planar type frequency shift probe for measuring plasma electron densities set forth in claim 1, wherein the length of said long narrow space is determined, based on the plasma electron density, and a resonant frequency decided by the plasma electron density at which a desirable precision is attainable.

9. A method for measuring plasma electron densities in a vessel by use of a planar type frequency shift probe for measuring plasma electron densities, the planar type frequency shift probe comprising a planar main body with a planar electrically conductive plate having an uncurved planar surface, the uncurved planar surface being a surface in which all lines normal to the surface, in any given area of the surface, are parallel to one another, and a coaxial cable formed by a surface conductor and a core conductor embedded in a dielectric material filled within said surface conductor, both of which are electrically connected to one surface of said planar main body, measuring plasma electron densities in said vessel by use of the resonance of electromagnetic waves, wherein said planar main body comprises a connecting part adjacent to the dead end of a long narrow space, in which one of both ends of the space has an opening on the periphery of said planar main body and first and second surface parts of said planar main body which are separated by said connecting part and yet mechanically integrated by said connecting part, and said surface conductor of said coaxial cable is electrically connected to one of the first and second surface parts and said core conductor is electrically connected to the other of the first and second surface parts, said method comprising the steps of:

providing for said planar main body to be arranged along the inner wall surface of said vessel; and inserting said planar type frequency shift probe within a porthole of said vessel when said planar main body is arranged along the inner wall surface of said vessel.

10. An apparatus for measuring plasma electron densities in a vessel, comprising:

a planar type frequency shift probe comprising a planar main body with a planar electrically conductive plate having an uncurved planar surface, the uncurved planar surface being a surface in which all lines normal to the surface, in any given area of the surface, are parallel to one another, and a coaxial cable formed by a surface conductor and a core conductor embedded in a dielectric material filled within said surface conductor, both of which are electrically connected to one surface of said planar main body, measuring plasma electron densities in a vessel by use of the resonance of electromagnetic waves, wherein said planar main body comprises a connecting part adjacent to the dead end of a long narrow space, in which one of both ends of the space has an opening on the periphery of said planar main body and first and second surface parts of said planar main body which are separated by said connecting part and yet mechanically integrated by said connecting part, and said surface conductor of said coaxial cable is electrically connected to one of the first and second surface parts and said core conductor is electrically connected to the other of the first and second surface parts, wherein the planar type frequency shift probe is situated within a port hole of said vessel.

11. The apparatus for measuring plasma electron densities set forth in claim 10, wherein said planar type frequency shift probe is situated within said port hole so that the inner wall surface of said vessel can be flush with the surface of said planar main body which is not electrically connected to said coaxial cable.

* * * * *